US010953542B2

(12) United States Patent
Hayashi

(10) Patent No.: US 10,953,542 B2
(45) Date of Patent: Mar. 23, 2021

(54) AUTONOMOUSLY ACTING ROBOT HAVING EMERGENCY STOP FUNCTION

(71) Applicant: GROOVE X, Inc., Tokyo (JP)

(72) Inventor: Kaname Hayashi, Tokyo (JP)

(73) Assignee: GROOVE X, INC., Tokyo (JP)

( * ) Notice: Subject to any disclaimer, the term of this patent is extended or adjusted under 35 U.S.C. 154(b) by 297 days.

(21) Appl. No.: 16/178,597

(22) Filed: Nov. 2, 2018

(65) Prior Publication Data
US 2019/0077018 A1    Mar. 14, 2019

Related U.S. Application Data

(63) Continuation of application No. PCT/JP2017/017232, filed on May 2, 2017.

(30) Foreign Application Priority Data

May 12, 2016 (JP) .............................. JP2016-095845

(51) Int. Cl.
B25J 9/16 (2006.01)
B25J 19/06 (2006.01)
(Continued)

(52) U.S. Cl.
CPC ............ B25J 9/1664 (2013.01); B25J 5/007 (2013.01); B25J 9/0009 (2013.01); B25J 19/06 (2013.01)

(58) Field of Classification Search
CPC ........ B25J 19/065; B25J 19/06; B25J 9/1697; B25J 11/008; B25J 11/009; B25J 11/0095; B25J 19/0091; B25J 19/023; B25J 5/00; B25J 5/007; B25J 9/0003; B25J 9/1664; B25J 9/1689; H01H 3/0226; H01H 13/52;
(Continued)

(56) References Cited

U.S. PATENT DOCUMENTS

2006/0113174 A1  6/2006  Hsu
2007/0192910 A1  8/2007  Vu et al.
(Continued)

FOREIGN PATENT DOCUMENTS

CN    105034002 A    11/2015
CN    105415378 A    3/2016
(Continued)

OTHER PUBLICATIONS

Office Action in JP Application No. 2018-198550, dated Nov. 19, 2019. 7pp.
(Continued)

Primary Examiner — Bhavesh V Amin
(74) Attorney, Agent, or Firm — Hauptman Ham, LLP

(57) ABSTRACT

A robot has a horn (gripping portion). A main body portion of the robot includes a direction determining unit that determines a direction of movement, a drive mechanism that executes a determined movement, a power supply unit that supplies power to the drive mechanism, and an interrupting mechanism that interrupts a supply of power from the power supply unit when the horn (gripping portion) is pulled out. When the horn is pulled out, a spring terminal and a conductor change to a state of non-contact, and a power line is physically disconnected, because of which the robot performs an emergency stop.

20 Claims, 19 Drawing Sheets

(51) Int. Cl.
*B25J 5/00* (2006.01)
*B25J 9/00* (2006.01)

(58) Field of Classification Search
CPC ........... H01H 15/102; H01H 2300/028; H01H 27/00; H01H 3/001; H01H 3/022; G05D 1/0274; G05D 1/0038; G05D 1/021; G05D 1/0225; G05D 1/0234; G05D 1/024; G05D 1/0242; G05D 1/0246; G05D 1/0251; G05D 1/0255; G05D 1/027; G05D 1/0272; G05D 2201/0206; G05D 2201/0207; G16H 40/67; G16H 20/00; G16H 20/13; G16H 40/63; G16H 70/40; Y10S 901/01; Y10S 901/47; Y10S 901/46; A63B 2071/0081; A63B 22/0235; A63B 71/0054; G06F 19/3418; G06F 3/0482; G06F 3/04842; G06F 3/04847; G06N 3/008; G06T 11/00; G06T 11/60; G06T 15/10; G06T 2200/24

See application file for complete search history.

(56) References Cited

U.S. PATENT DOCUMENTS

| | | |
|---|---|---|
| 2009/0090606 A1 | 4/2009 | Liao |
| 2012/0197439 A1 | 8/2012 | Wang et al. |
| 2015/0027862 A1 | 1/2015 | Takeuchi et al. |
| 2015/0314434 A1* | 11/2015 | Bevins, Jr. ................ B25F 5/00 30/514 |
| 2017/0173262 A1* | 6/2017 | Veltz .................... A61B 5/0022 |
| 2019/0077018 A1* | 3/2019 | Hayashi ................ B25J 9/0009 |

FOREIGN PATENT DOCUMENTS

| | | |
|---|---|---|
| EP | 2022538 A1 | 2/2009 |
| JP | S52-124176 A | 10/1977 |
| JP | S57-107240 U | 7/1982 |
| JP | 2002-36152 A | 2/2002 |
| JP | 2002-224990 A | 8/2002 |
| JP | 2003-266363 A | 9/2003 |
| JP | 2003266340 A | 9/2003 |
| JP | 2004-258967 A | 9/2004 |
| JP | 2005-5608 A | 1/2005 |
| JP | 2005-59160 A | 3/2005 |
| JP | 2005-288602 A | 10/2005 |
| JP | 2008-296368 A | 12/2008 |
| JP | 2009-509673 A | 3/2009 |
| JP | 4385159 B2 | 12/2009 |
| JP | 2010-125546 A | 6/2010 |
| JP | 4524928 B2 | 8/2010 |
| JP | 2014-503376 A | 2/2014 |
| JP | 2015-24467 A | 2/2015 |

OTHER PUBLICATIONS

Written Opinion of the ISA in PCT/JP2017/017232, dated Aug. 1, 2017, 11pp.
International Search Report in PCT/JP2017/017232, dated Aug. 1, 2017. 6pp.
Office Action in JP Application No. 2017-568466, dated Mar. 6, 2018. 12pp.
Office Action in JP Application No. 2017-568466, dated Jul. 10, 2018. 6pp.
Office Action in CN Application No. 201780023395.9, dated Jan. 26, 2021. 20pp.

* cited by examiner

AUTONOMOUSLY ACTING ROBOT HAVING EMERGENCY STOP FUNCTION

RELATED APPLICATIONS

The present application is a continuation of International Application No. PCT/JP2017/017232, filed May 2, 2017, which claims priority from Japanese Application No. 2016-095845, filed May 12, 2016, the disclosures of which application are hereby incorporated by reference herein in their entirety.

FIELD

The present disclosure relates to a robot that autonomously selects an action in accordance with an internal state or an external environment.

Although robot technology has advanced swiftly in recent years, the technology has not produced a presence as a pet-like companion. The inventors believe that this is because people do not consider a robot as having a free will. A human, by observing an action such that it can only be thought that a pet has a free will, feels the existence of a free will in the pet, empathizes with the pet, and is given solace by the pet.

The inventors believe that if there were a robot that can emulate a human-like or animal-like action, in other words, a robot that can autonomously select a human-like or animal-like action, empathy toward the robot could be greatly increased.

Meanwhile, however "animal-like" a robot may be, the robot is still a machine, and as such, safety measures are needed. One safety measure is an emergency stop function.

A robot of Patent Literature 1 has a comparatively large handle on a back (refer to FIGS. 1 and 2), and detects a grip of a user using a pressure sensor incorporated in the handle. When the handle is gripped, a joint actuator is weakened. A cleaning robot of Patent Literature 2 can be caused to perform an emergency stop by a load being applied from above a main body. A robot of Patent Literature 3 is such that an emergency stop switch is installed in multiple places on a main body.

CITED REFERENCES LIST

Patent Literature

Patent Literature 1: JP-A-2008-296368
Patent Literature 2: JP-A-2004-258967
Patent Literature 3: JP-A-2002-224990

An emergency stop function of a robot needs to meet two conditions, those being firstly that the robot can reliably be stopped, and secondly that the robot is unlikely to stop erroneously due to force majeure. A prerequisite of the emergency stop function of JP-A-2008-296368 is a normal operation of the pressure sensor. JP-A-2004-258967 and JP-A-2002-224990 cause the robot to perform an emergency stop using an electrical signal. However, when an electrical system fails, there is a possibility that the robot cannot be stopped using this kind of method.

Also, when causing an emergency stop to be performed by applying a load, as in JP-A-2004-258967, the cleaning robot will also perform an emergency stop when an object falls on the cleaning robot. In the case of JP-A-2002-224990, there is a possibility of an emergency stop switch being pressed, and the robot performing an emergency stop, when the robot bumps into an object such as a wall.

SUMMARY

The invention, having been completed based on recognition of the heretofore described problems, has a main object of providing technology for causing a robot to perform an emergency stop appropriately.

An autonomously acting robot in an aspect of the invention includes a main body portion and a gripping portion attached to the main body portion.

The main body portion includes a drive mechanism that drives a main body, a power supply unit that supplies power to the drive mechanism, and an interrupting mechanism that interrupts the supply of power from the power supply unit when the gripping portion is pulled out.

An autonomously acting robot in another aspect of the invention includes a main body portion and a gripping portion attached to the main body portion.

The main body portion includes a first power line that supplies power to an electronic circuit that selects an operation of the robot, a second power line that supplies power to a drive mechanism that executes the selected operation, and an interrupting mechanism that cuts off the second power line when the gripping portion is pulled out.

Continuity of the first power line is maintained even when the gripping portion is pulled out.

According to aspects of the invention, a robot is more reliably easily caused to perform an emergency stop.

DETAILED DESCRIPTION OF THE INVENTION

Figure 1A:
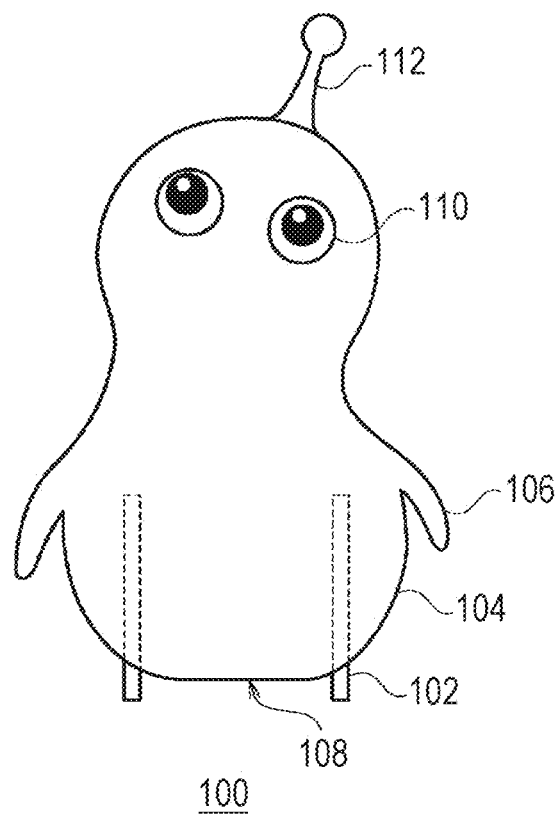
FIG. 1A is a front external view of a robot.
Figure 1B:
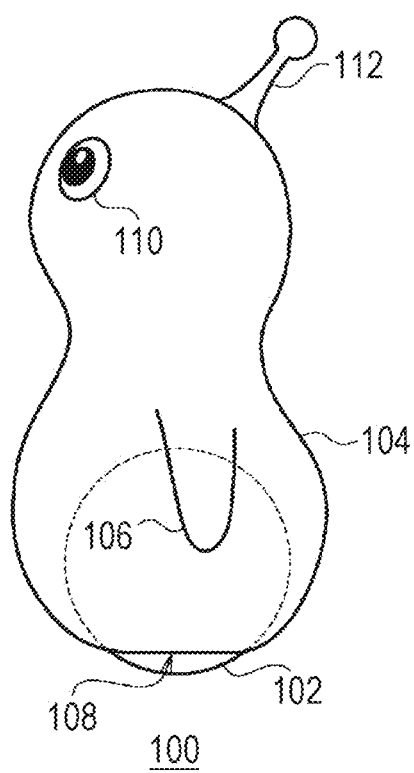
FIG. 1B is a side external view of the robot.

FIG. 1A is a front external view of a robot 100. FIG. 1B is a side external view of the robot 100.

The robot 100 in at least one embodiment is an autonomously acting robot that determines an action or gesture based on an external environment and an internal state. The external environment is recognized using various kinds of sensor, such as a camera or a thermosensor. The internal state is quantified as various parameters that express emotions of the robot 100. These will be described hereafter.

With indoor action as a precondition, the robot 100 of at least one embodiment has, for example, an interior of an owner's home as an action range. Hereafter, a human involved with the robot 100 will be called a "user", and a user forming a member of a home to which the robot 100 belongs will be called an "owner".

A body 104 of the robot 100 has a rounded form all over, and is formed of a soft material having elasticity, such as urethane, rubber, or resin. The robot 100 may be clothed. By the body 104, which is rounded, soft, and pleasant to touch, being adopted, the robot 100 provides a user with a sense of security and a pleasant tactile sensation.

A total weight of the robot 100 is 15 kilograms or less. In at least one embodiment, the total weight of the robot 100 is 10 kilograms or less. In at least one embodiment the total weight of the robot 100 is 5 kilograms or less. A majority of babies start to walk by themselves 13 months after birth. An average weight of a baby 13 months after birth is a little over 9 kilograms for boys, and a little under 9 kilograms for girls. Because of this, when the total weight of the robot 100 is 10 kilograms or less, a user can hold the robot 100 with an effort practically equivalent to that of holding a baby that cannot walk unassisted.

An average weight of a baby less than 2 months afterbirth is less than 5 kilograms for both boys and girls. Consequently, when the total weight of the robot 100 is 5 kilograms or less, a user can hold the robot 100 with an effort practically equivalent to that of holding a very young baby.

Advantages of a user holding the robot 100 easily, and wanting to hold the robot 100, are realized by the attributes of appropriate weight and roundness, softness, and pleasantness of touch. For the same reasons, a height of the robot 100 is 1.2 meters or less. In at least one embodiment, the height of the robot 100 is 0.7 meters or less.

Being able to be held is a concept of the robot 100 in at least one embodiment.

The robot 100 moves using a wheel 102. A rotational speed and a direction of rotation of two of the wheel 102 can be individually controlled. Also, the wheel 102 can also be slid upward in an interior of the body 104 of the robot 100, and completely stored in the body 104. A greater portion of the wheel 102 is hidden by the body 104 when traveling too, but when the wheel 102 is completely stored in the body 104, the robot 100 is in a state of being unable to move (hereafter called a "sitting state"). In the sitting state, a flat seating face 108 is in contact with a floor surface.

The robot 100 has two arms 106. The arms 106 do not have a function of gripping an object. The arms 106 can perform simple actions such as raising, waving, and oscillating. The two arms 106 can also be controlled individually.

A camera is incorporated in an eye 110. The eye 110 is also capable of an image display using a liquid crystal element or an organic EL element. In addition to the camera incorporated in the eye 110, various sensors, such as a highly directional microphone or an ultrasonic sensor, are mounted in the robot 100. Also, a speaker is incorporated, and the robot 100 is also capable of simple speech.

A horn 112 is attached to a head portion of the robot 100. As the robot 100 is lightweight, as heretofore described, a user can also lift up the robot 100 by grasping the horn 112.

Figure 2:
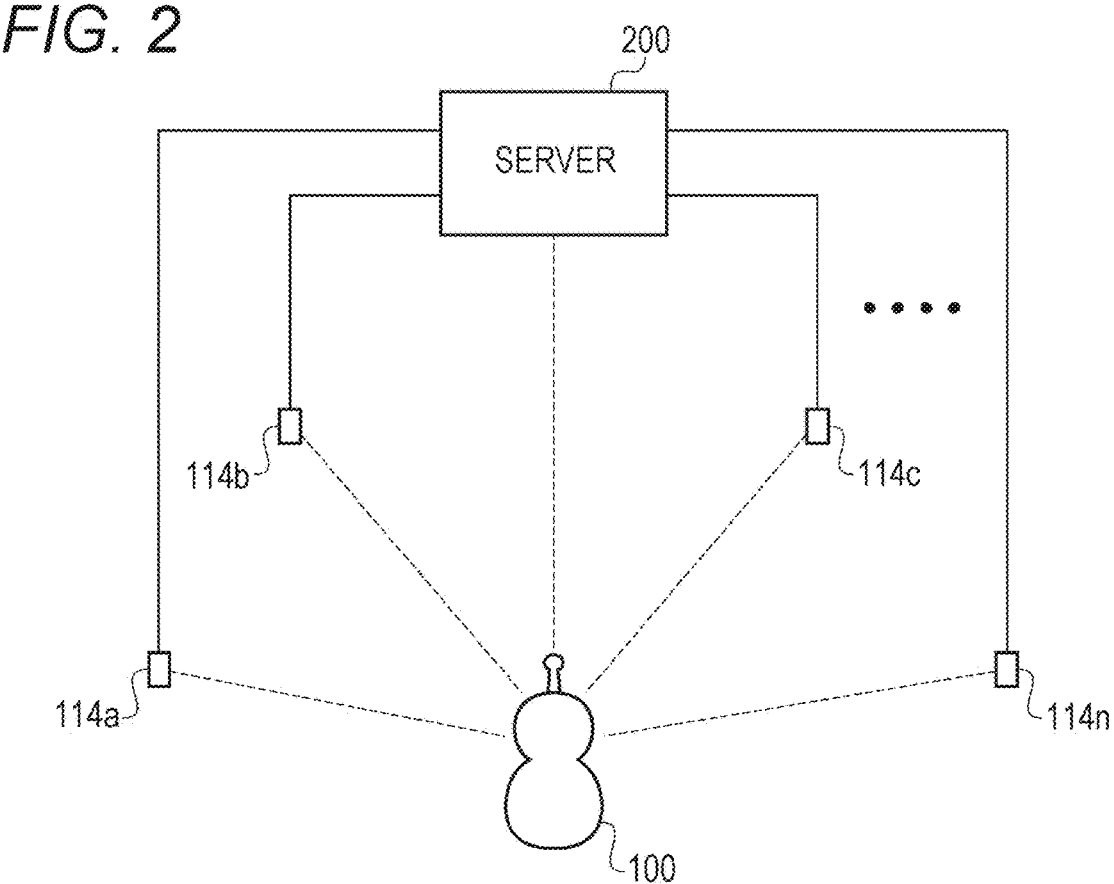
FIG. 2 is a configuration diagram of a robot system.

FIG. 2 is a configuration diagram of a robot system 300.

The robot system 300 includes the robot 100, a server 200, and a multiple of external sensors 114. The multiple of external sensors 114 (external sensors 114a, 114b, and so on to 114n) are installed in advance in a house. The external sensor 114 may be fixed to a wall surface of the house, or may be placed on a floor. Positional coordinates of the external sensor 114 are registered in the server 200. The positional coordinates are defined as x, y coordinates in the house envisaged to be an action range of the robot 100.

The server 200 is installed in the house. The server 200 and the robot 100 in at least one embodiment correspond one-to-one. The server 200 determines a basic action of the robot 100 based on information obtained from the sensors incorporated in the robot 100 and the multiple of external sensors 114.

The external sensor 114 is for reinforcing sensory components of the robot 100, and the server 200 is for reinforcing processing power of the robot 100.

The external sensor 114 regularly transmits a wireless signal (hereafter called a "robot search signal") including ID (hereafter called "beacon ID") of the external sensor 114. On receiving the robot search signal, the robot 100 returns a wireless signal (hereafter called a "robot response signal") including beacon ID. The server 200 measures a time from the external sensor 114 transmitting the robot search signal until receiving the robot response signal, and measures a distance from the external sensor 114 to the robot 100. By measuring the distance between each of the multiple of external sensors 114 and the robot 100, the server 200 identifies the positional coordinates of the robot 100.

Of course, a method whereby the robot 100 regularly transmits positional coordinates to the server 200 may also be adopted.

Figure 3:
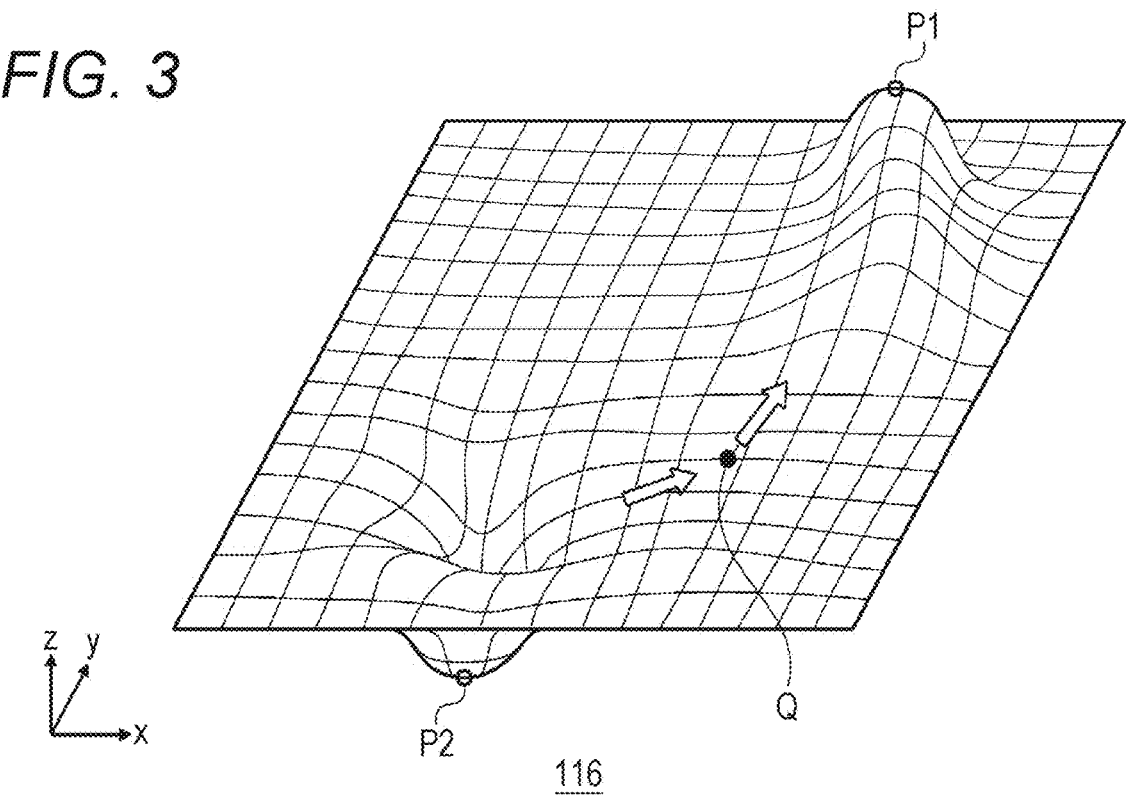
FIG. 3 is a schematic view of an emotion map.

FIG. 3 is a schematic view of an emotion map 116.

The emotion map 116 is a data table stored in the server 200. The robot 100 selects an action in accordance with the emotion map 116. The emotion map 116 shown in FIG. 3 shows a magnitude of an emotional attraction or aversion toward a place of the robot 100. An x axis and a y axis of the emotion map 116 indicate two-dimensional spatial coordinates. A z axis indicates a magnitude of an emotional attraction or aversion. When a z value is a positive value, an attraction toward the place is high, and when the z value is a negative value, the robot 100 is averse to the place.

On the emotion map 116 of FIG. 3, a coordinate P1 is a point in an indoor space managed by the server 200 as the action range of the robot 100 at which an emotion of attraction is high (hereafter called a favored point). The favored point may be a "safe place", such as behind a sofa or under a table, or may be a place in which people tend to gather or a lively place, like a living room. Also, the safe place may be a place where the robot 100 was gently stroked or touched in the past.

A definition of what kind of place the robot 100 favors is arbitrary, but the favored place is generally a place that is favored by small children, or by small animals such as dogs or cats, is set as a favored point.

A coordinate P2 is a point at which an emotion of aversion is high (hereafter called a "disliked point"). The disliked point may be a place where there is a loud noise, such as near a television, a place where there is likely to be a leak, like a bathroom or a washroom, an enclosed space or a dark place, a place where the robot 100 has been roughly treated by a user and that invokes an unpleasant memory, or the like.

A definition of what kind of place the robot 100 dislikes is also arbitrary, but the disliked place is generally a place feared by small children, or by small animals such as dogs or cats, is set as a disliked point.

A coordinate Q indicates a current position of the robot 100. The server 200 identifies position coordinates of the robot 100, using the robot search signal regularly transmitted by the multiple of external sensors 114 and the robot response signal responding to the robot search signal. For example, when the external sensor 114 with beacon ID=1 and the external sensor 114 with beacon ID=2 each detect the robot 100, the server 200 obtains the distances of the robot 100 from the two external sensors 114, and obtains the positional coordinates of the robot 100 from the distances.

In at least one embodiment, the external sensor 114 with beacon ID=1 transmits the robot search signal in a multiple of directions, and the robot 100 returns the robot response signal when receiving the robot search signal. By so doing, the server 200 may ascertain in which direction, and at what distance, the robot 100 is from which external sensor 114. Also, in at least one embodiment, the server 200 may calculate a distance moved by the robot 100 from the rotational speed of the wheel 102, thereby identifying the current position, or may identify the current position based on an image obtained from the camera.

When the emotion map 116 shown in FIG. 3 is provided, the robot 100 moves in a direction toward the favored point (coordinate P1), or in a direction away from the disliked point (coordinate P2).

The emotion map 116 changes dynamically. When the robot 100 arrives at the coordinate P1, the z value (emotion of attraction) at the coordinate P1 decreases with the passing of time. Because of this, the robot 100 can emulate animal-like behavior of arriving at the favored point (coordinate P1), "being emotionally satisfied", and in time "getting bored" with the place. In the same way, the emotion of aversion at the coordinate P2 is alleviated with the passing of time. A new favored point or disliked point appears together with the elapse of time, because of which the robot 100 carries out a new action selection. The robot 100 has "interest" in a new favored point, and ceaselessly carries out a new action selection.

The emotion map 116 expresses emotional swings as an internal state of the robot 100. The robot 100 heads for a favored point, avoids a disliked point, stays for a while at the favored point, and in time performs the next action. With this kind of control, the action selection of the robot 100 can be a human-like or animal-like action selection.

Maps that affect an action of the robot 100 (hereafter collectively called "action maps") are not limited to the type of emotion map 116 shown in FIG. 3. For example, various action maps such as curiosity, a desire to avoid fear, a desire to seek safety, and a desire to seek physical ease such as quietude, low light, coolness, or warmth, can be defined. Further, an objective point of the robot 100 may be determined by taking a weighted average of the z values of each of a multiple of action maps.

The robot 100 may also have, in addition to an action map, parameters that indicate a magnitude of various emotions or senses. For example, when a value of a sadness emotion parameter is increasing, a weighting coefficient of an action map that evaluates places in which the robot 100 feels at ease may be set high, and the value of this emotion parameter reduced by the robot 100 reaching a target point.

In the same way, when a value of a parameter indicating a sense of boredom is increasing, a weighting coefficient of an action map that evaluates places in which curiosity is satisfied is set high.

Figure 4:
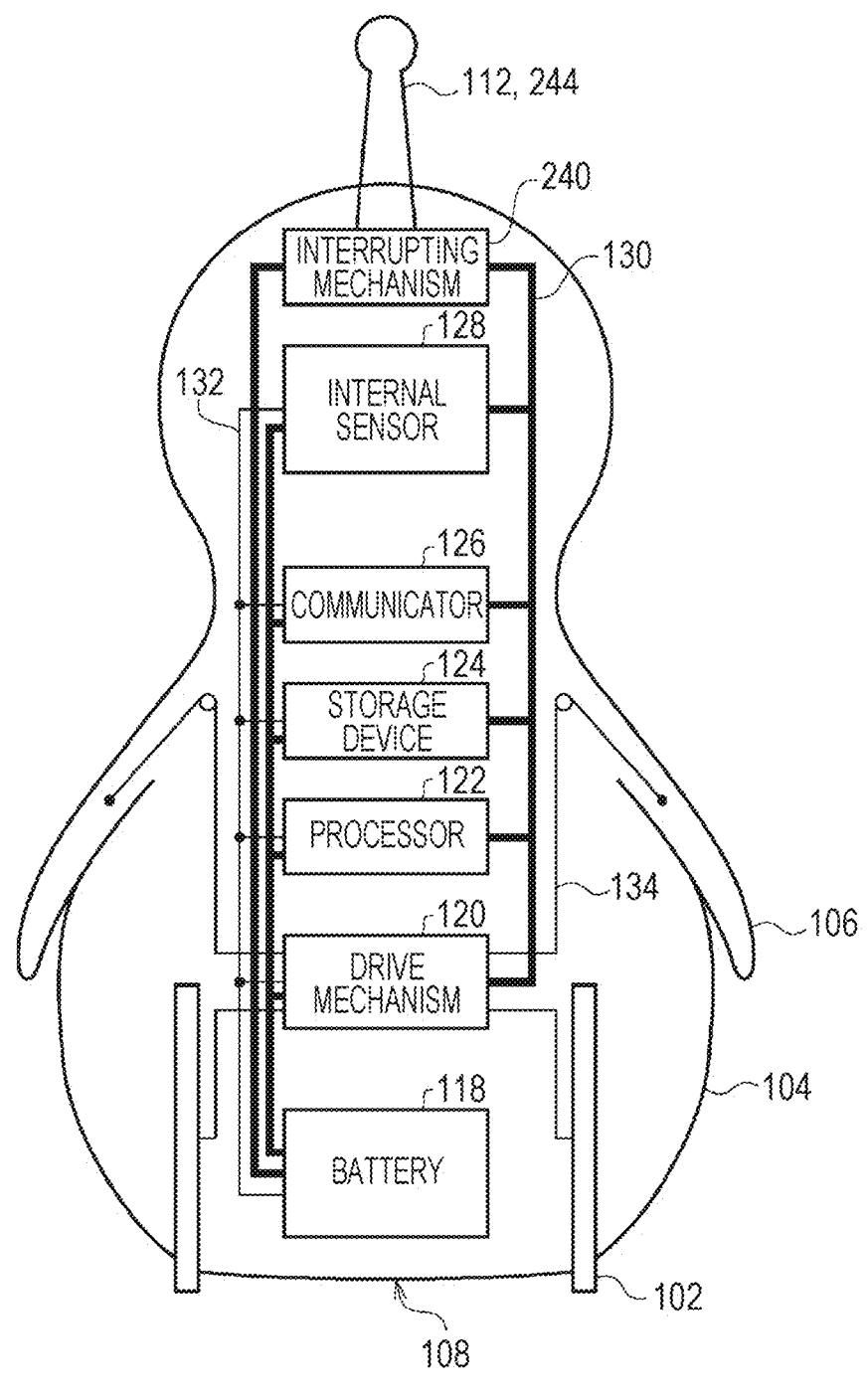
FIG. 4 is a hardware configuration diagram of the robot.

FIG. 4 is a hardware configuration diagram of the robot 100.

The robot 100 includes an internal sensor 128, a communicator 126, a storage device 124, a processor 122, a drive mechanism. 120, an interrupting mechanism 240, and a battery 118 (power supply unit). The units are connected to each other by a power line 130 and a signal line 132. The battery 118 supplies power to each unit via the power line 130. Each unit transmits and receives a control signal via the signal line 132. The battery 118 is a rechargeable battery such as a lithium ion rechargeable battery, and is a power source of the robot 100.

The internal sensor 128 is a collection of various kinds of sensor incorporated in the robot 100. Specifically, the internal sensor 128 is a camera, a highly directional microphone, an infrared sensor, a thermosensor, a touch sensor, an acceleration sensor, a smell sensor, and the like. The smell sensor is an already known sensor that applies a principle that electrical resistance changes in accordance with an adsorption of a molecule forming a source of a smell. The smell sensor classifies various smells into multiple kinds of category (hereafter called "smell categories").

The communicator 126 is a communication module that carries out wireless communication with the server 200 and various kinds of external device, such as the external sensor 114 and a mobile device possessed by a user, as a target. The storage device 124 is configured of a non-volatile memory and a volatile memory, and stores a computer program and various kinds of setting information. The processor 122 is means of executing a computer program. The drive mechanism 120 is an actuator that controls various mechanisms, such as the wheels 102 and the arms 106.

In addition to this, an indicator, a speaker, and the like are also mounted in the robot 100.

The processor 122 selects an action of the robot 100 while communicating with the server 200 or the external sensor 114 via the communicator 126. Various kinds of external information obtained by the internal sensor 128 also affect the action selection. The drive mechanism 120 mainly controls the wheel 102 and the arm 106. The drive mechanism 120 changes a direction of movement and a movement speed of the robot 100 by changing the rotational speed and the direction of rotation of each of the two wheels 102. Also, the drive mechanism 120 can also raise and lower the wheel 102. When the wheel 102 rises, the wheel 102 is completely stored in the body 104, and the robot 100 comes into contact with a floor surface via the seating face 108, taking on the sitting state.

The arm 106 can be lifted up by the drive mechanism 120 pulling the arm 106 via a wire 134. A gesture like an arm waving can also be performed by the arm 106 being caused to oscillate. A more complex gesture can also be represented by a large number of the wire 134 being utilized. That is, as the number of wires 134 in arm 106 complexity of possible gestures by arm 106 increases.

The interrupting mechanism 240 is coupled to the horn 112 (a gripping portion 244). When the horn 112 is pulled, the interrupting mechanism 240 causes the power line 130 to become disconnected, whereby the robot 100 performs an emergency stop. Details of the interrupting mechanism 240 will be described hereafter.

Figure 5:
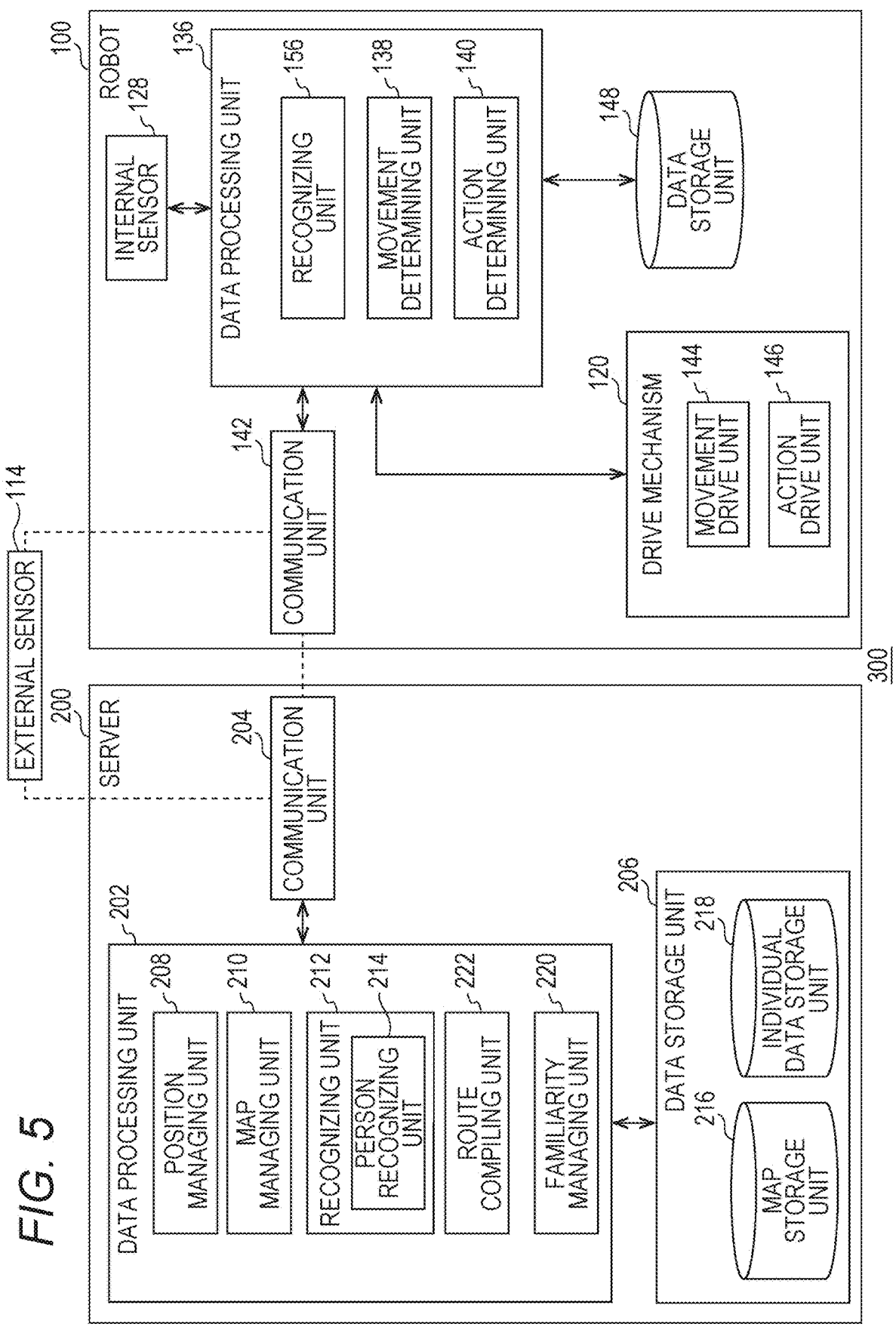
FIG. 5 is a functional block diagram of the robot system.

FIG. 5 is a functional block diagram of a robot system 300.

As heretofore described, the robot system 300 includes the robot 100, the server 200, and the multiple of external sensors 114. Each component of the robot 100 and the server 200 is realized by hardware including a computer formed of a CPU (central processing unit), various kinds of coprocessor, and the like, a storage device that is a memory or storage, and a wired or wireless communication line that links the computer and the storage device, and software that is stored in the storage device and supplies a processing command to the computer. A computer program may be configured of a device driver, an operating system, various kinds of application program positioned in an upper layer thereof, and a library that provides a common function to the programs. Each block described hereafter indicates a functional unit block rather than a hardware unit configuration.

One portion of the functions of the robot 100 may be realized by the server 200, and one portion or all of the functions of the server 200 may be realized by the robot 100.

Server 200

The server 200 includes a communication unit 204, a data processing unit 202, and a data storage unit 206. The communication unit 204 manages a process of communicating with the external sensor 114 and the robot 100. The data storage unit 206 stores various kinds of data. The data processing unit 202 executes various kinds of process based on data acquired by the communication unit 204 and data stored in the data storage unit 206. The data processing unit 202 also functions as an interface of the communication unit 204 and the data storage unit 206.

The data storage unit 206 includes a map storage unit 216 and an individual data storage unit 218. The map storage unit 216 stores a multiple of action maps. The individual data storage unit 218 stores information on a user, and in particular, on an owner. Specifically, the individual data storage unit 218 stores various kinds of parameter such as familiarity with respect to a user, and physical characteristics and behavioral characteristics of a user. The individual data storage unit 218 may also store attribute information such as age and gender.

The robot 100 identifies a user based on the physical characteristics and the behavioral characteristics of the user. The robot 100 constantly captures a periphery using the incorporated camera. Further, the robot 100 extracts the physical characteristics and the behavioral characteristics of a person appearing in an image. The physical characteristics may be visual characteristics inherent to a body, such as a height, clothes worn by choice, a presence or absence of spectacles, a skin gloss, a hair color, or an ear size, or may also include other characteristics such as an average body temperature, a smell, or a voice quality. The behavioral characteristics, specifically, are characteristics accompanying behavior, such as a place the user favors, a briskness of movement, and a presence or absence of smoking. For example, the robot 100 extracts behavioral characteristics such that an owner identified as a father is often out of the home, and is often motionless on a sofa when at home, but a mother is often in a kitchen, and an activity range is broad.

The robot 100 clusters users appearing with a high frequency as "owners" based on physical characteristics and behavioral characteristics obtained from a large amount of image information and other sensing information.

Although the method of identifying a user from user ID is simple and reliable, the user having a device that can provide user ID is a precondition. Meanwhile, the method of identifying a user from physical characteristics or behavioral characteristics is such that an image recognition process is weighty, but there is an advantage in that even a user who does not have a mobile device can be identified. One of the two methods may be employed alone, or user identification may be carried out using the two methods together in a complementary way.

In at least one embodiment, users are clustered based on physical characteristics and behavioral characteristics, and a user is identified using deep learning (a multilayer neural network).

The robot 100 has a familiarity internal parameter for each user. When the robot 100 recognizes an action indicating a liking toward the robot 100, such as picking the robot 100 up or speaking to the robot 100, familiarity with respect to that user increases. Familiarity decreases with respect to a user not involved with the robot 100, a user who behaves roughly, or a user met infrequently.

The data processing unit 202 includes a position managing unit 208, a map managing unit 210, a recognizing unit 212, a route compiling unit 222, and a familiarity managing unit 220.

The position managing unit 208 identifies the positional coordinates of the robot 100 using the method described using FIG. 2. Also, the position managing unit 208 may also track positional coordinates of a user in real time.

The map managing unit 210 selects one of a multiple of action maps, and decides the direction of movement of the robot 100 based on the z value of the selected action map. The map managing unit 210 may also decide the direction of movement of the robot 100 by taking a weighted average of the z values of the multiple of action maps.

For example, it is assumed that the z values at a coordinate R1 and a coordinate R2 on an action map A are 4 and 3, and the z values at the coordinate R1 and the coordinate R2 on an action map B are −1 and 3. When taking a simple average, the total z value at the coordinate R1 is 4−1=3, and the total z value at the coordinate R2 is 3+3=6, because of which the robot 100 heads in the direction of the coordinate R2 rather than the coordinate R1.

When the action map A is weighted 5 times with respect to the action map B, the total z value at the coordinate R1 is 4×5−1=19, and the total z value at the coordinate R2 is 3×5+3=18, because of which the robot 100 heads in the direction of the coordinate R1.

The recognizing unit 212 recognizes an external environment. Various kinds of recognition, such as recognition of weather or season based on temperature and humidity, and recognition of shelter (a safe area) based on an amount of light and temperature, are included in the recognition of the external environment. The recognizing unit 212 further includes a person recognizing unit 214. The person recognizing unit 214 recognizes a person from an image captured by the camera incorporated in the robot 100, and extracts the physical characteristics and behavioral characteristics of the person. Further, based on the physical characteristic information and the behavioral characteristic information registered in the individual data storage unit 218, the person recognizing unit 214 determines what person, such as a father, a mother, or an eldest son, the person captured, that is, the person the robot 100 is looking at, corresponds to.

In addition to a person, the person recognizing unit 214 also, for example, extracts characteristics of a cat or a dog that is a pet. Hereafter, a description will be given assuming that not only a person but also a pet is included as a user or an owner.

Furthermore, the person recognizing unit 214 recognizes various responsive actions performed with respect to the robot 100, and recognizes the actions as being pleasant or unpleasant actions (to be described hereafter).

The route compiling unit 222 compiles a route along which the robot 100 should move. The route compiling unit 222 compiles a multiple of candidate routes, and the robot 100 may select any of the routes. Route selection will be described hereafter.

The familiarity managing unit 220 manages familiarity for each user. As heretofore described, familiarity is registered as one portion of individual data in the individual data storage unit 218.

Robot 100

The robot 100 includes a communication unit 142, a data processing unit 136, a data storing unit 148, a drive mechanism 120, and an internal sensor 128. The communication unit 142 corresponds to the communicator 126 (refer to FIG. 4), and manages a process of communicating with the external sensor 114 and the server 200. The data storing unit 148 stores various kinds of data. The data storing unit 148 corresponds to the storage device 124 (refer to FIG. 4). The data processing unit 136 executes various kinds of process based on data acquired by the communication unit 142 and data stored in the data storing unit 148. The data processing unit 136 corresponds to the processor 122 and a computer program executed by the processor 122. The data processing unit 136 also functions as an interface of the communication unit 142, the internal sensor 128, the drive mechanism 120, and the data storing unit 148.

The data processing unit 136 includes a recognizing unit 156, a movement determining unit 138, and an action determining unit 140.

The drive mechanism 120 includes a movement drive unit 144 and an action drive unit 146. The movement determining unit 138 decides a direction of movement of the robot 100. The movement drive unit 144 causes the robot 100 to head toward a target point by driving the wheels 102 in accordance with an instruction from the movement determining unit 138. The map managing unit 210 of the server 200 calculates a movement destination (target point) of the robot 100 in real time, based on an action map. The server 200 transmits the coordinates of the target point to the robot 100, and the movement determining unit 138 causes the robot 100 to move toward the target point.

Although an action map decides the main element of the direction of movement of the robot 100, the robot 100 of at least one embodiment can also carry out specific actions compliant with familiarity. Multiple kinds of behavioral pattern may be defined in accordance with familiarity.

The action determining unit 140 decides a gesture of the robot 100. Multiple gestures are defined in advance in the data storing unit 148. Specifically, a gesture of sitting by housing the wheel 102, a gesture of raising the arm 106, a gesture of causing the robot 100 to carry out a rotating action by causing the two wheels 102 to rotate in reverse or by causing only one wheel 102 to rotate, a gesture of shaking by causing the wheel 102 to rotate in a state in which the wheel 102 is housed, and the like are defined.

The action determining unit 140 can also perform a gesture of holding up both arms 106 as a gesture asking for "a hug" when a user with a high degree of familiarity is nearby, and can also perform a gesture of no longer wanting to be hugged by causing the wheel 102 to rotate in reverse in a housed state when bored of the "hug". The action drive unit 146 causes the robot 100 to perform various gestures by driving the wheel 102 and the arm 106 in accordance with an instruction from the action determining unit 140.

The recognizing unit 156 analyzes external information obtained from the internal sensor 128. The recognizing unit 156 is capable of visual recognition (a visual unit), smell recognition (an olfactory unit), sound recognition (an aural unit), and tactile recognition (a tactile unit).

The recognizing unit 156 regularly captures an outside environment using the incorporated camera (the internal sensor 128), and detects a user that is a moving object such as a person or a pet. Characteristics thereof are transmitted to the server 200, and the person recognizing unit 214 of the server 200 extracts the physical characteristics of the moving object. Also, the recognizing unit 156 also detects a smell of the user and a voice of the user. Smell and sound (voice) are classified into multiple kinds using an already known method. Also, the recognizing unit 156 can also detect a temperature when touched using an incorporated temperature sensor.

When a strong force is applied to the robot 100, the recognizing unit 156 recognizes this using an incorporated acceleration sensor, and the person recognizing unit 214 of the server 200 recognizes that a "violent action" has been performed by a user in the vicinity. When a user picks the robot 100 up by grabbing the horn 112, this may also be recognized as a violent action. When a user in a state of confronting the robot 100 speaks in a specific volume region and a specific frequency band, the person recognizing unit 214 of the server 200 may recognize that a "speaking action" has been performed with respect to the robot 100. Also, when a temperature in the region of body temperature is detected, the person recognizing unit 214 of the server 200 recognizes that a "touching action" has been performed by a user, and when upward acceleration is detected in a state in which touching is recognized, the person recognizing unit 214 of the server 200 recognizes that a "hug" has been performed. Physical contact when a user raises the body 104 may also be sensed, and a hug may also be recognized by a load acting on the wheel 102 decreasing.

In this way, the person recognizing unit 214 of the server 200 recognizes various kinds of response by a user toward the robot 100. "Pleasant" or "unpleasant" is correlated to one portion of typical responsive actions among these various kinds of responsive action. A series of recognition processes including detecting, analyzing, and determining may be carried out by the recognizing unit 212 of the server 200 alone, or carried out by the recognizing unit 156 of the robot 100 alone, or the two may execute the recognition processes while dividing roles.

The familiarity managing unit 220 of the server 200 changes the familiarity toward a user in accordance with a response recognized by the recognizing unit 156. Essentially, the familiarity toward a user who carries out a pleasant action increases, while the familiarity toward a user who carries out an unpleasant action decreases.

The recognizing unit 212 of the server 200 may determine whether a response is pleasant or unpleasant, and the map managing unit 210 may change the z value of the point at which the pleasant or unpleasant action has been carried out on an action map that represents "affection toward a place". For example, when a pleasant action is carried out in a living room, the map managing unit 210 may set a favored point at a high probability in the living room. In this case, a positive feedback advantage is realized in that the robot 100 favors the living room, and further favors the living room due to being the recipient of a pleasant action in the living room.

The route compiling unit 222 of the server 200 compiles as needed a movement route (hereafter called an "escape route") assuming a case in which an unknown person, that is, a moving object with low familiarity, is detected (hereafter called an "escape event"), with the current position of the robot 100 as an origin. In order to decide an escape route, at least (1) a selection of a final movement position (hereafter called a "movement ending position") and (2) a position from which movement is to be started (hereafter called a "movement starting position") are needed. When the movement ending position is sought, a route from the movement starting position to the movement ending position compiled, and a shift made to actual action, after the robot 100 detects an unknown person, time taken until action increases. Because of this, an escape action that should by rights be an immediate action becomes unnatural.

The route compiling unit 222 compiles as needed an escape route in accordance with the current position of the robot 100, even when no escape event has occurred. When an escape event occurs, the robot 100 can immediately take evasive action based on an escape route compiled in advance by the route compiling unit 222. It is sufficient that the movement starting position is the current position of the robot 100. The movement ending position may be an arbitrary position separated by a predetermined distance from the robot 100, or may be set in a vicinity of a user whose familiarity is of a predetermined value or greater.

The function of the route compiling unit 222 may be mounted in the robot 100 rather than in the server 200.

The map managing unit 210 compiles a map (hereafter called a "static map") recording a safe place, such as a position of furniture behind which the robot 100 can hide or a safe place, existing in a space in which the robot 100 exists, and stores the map in the map storage unit 216. Also, the map managing unit 210 compiles a map (hereafter called a "dynamic map") recording a position of a person with high familiarity who is in the space in which the robot 100 exists (normally in the same house), and stores the map in the map storage unit 216. The route compiling unit 222 may utilize the dynamic map with priority over the static map. Because of this, the robot 100 can prioritize an evasive action of hiding behind a person over hiding behind an object when an escape event occurs.

The route compiling unit 222 refers to the static map and the dynamic map saved in the map storage unit 216, and adopts a point nearest to the current position of the robot 100 as the movement ending position. Further, the route compiling unit 222 compiles as needed an escape route from the movement starting position to the movement ending position. The route compiling unit 222 may compile an escape route every time the robot 100 moves, or may compile an escape route regularly.

Emergency Stop Function

Figure 6:
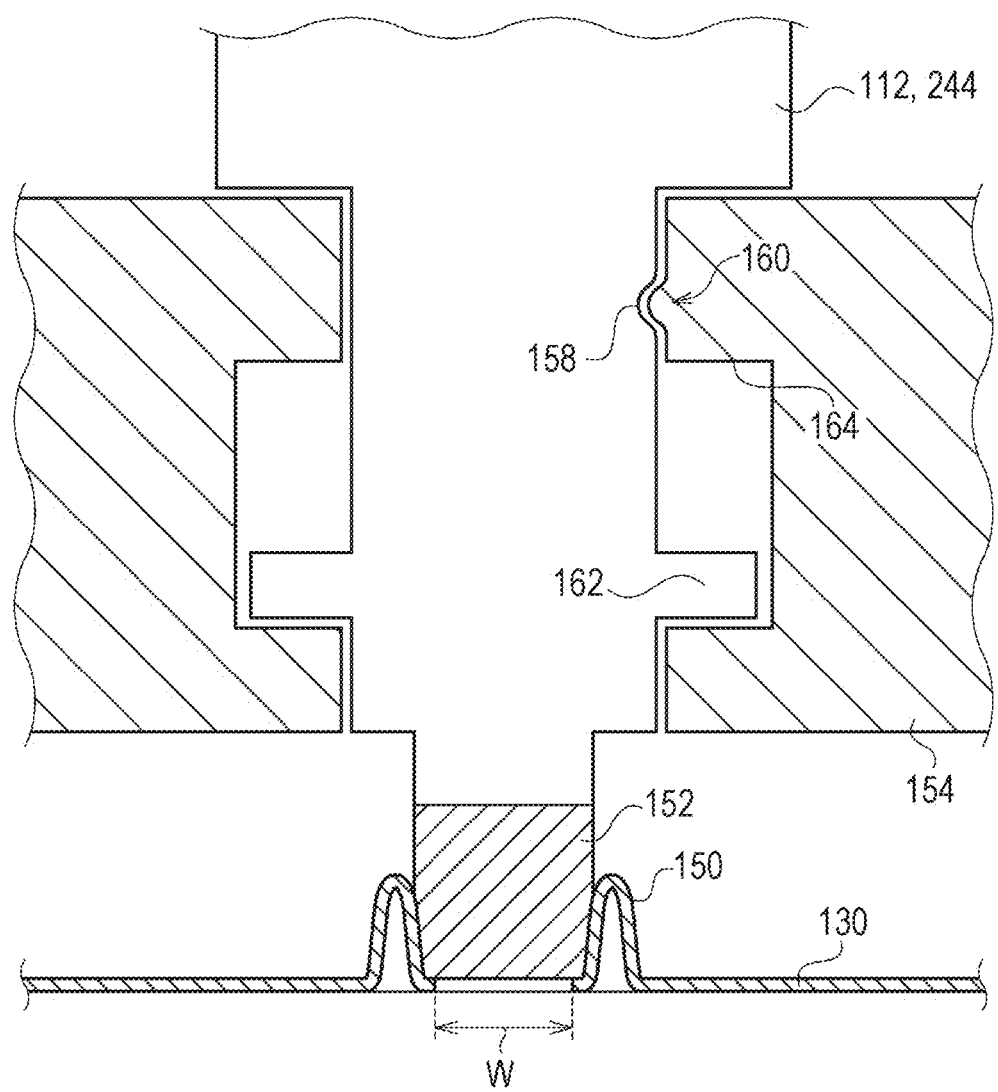
FIG. 6 is a configuration diagram of an interrupting mechanism in an embodiment.

FIG. 6 is a configuration diagram of the interrupting mechanism 240 in this embodiment.

The power line 130 is separated by a width W across a spring terminal 150. In other words, the power line 130 is partially disconnected. The horn 112 (gripping portion 244) in this embodiment is formed of an insulating resin, but a leading end portion thereof is coated with a conductor 152 such as copper. One portion of the horn 112 protrudes to an exterior from an outer shell 154 (the body 104) of the robot 100. The outer shell 154 is made of resin. When the horn 112 is pressed in a downward direction of the drawing, the conductor 152 and the spring terminal 150 come into contact, and the power line 130 has continuity via the conductor 152.

A small projection 160 is formed on an inner wall of the outer shell 154, and a cutaway 158 is formed in the horn 112 (gripping portion 244). When the horn 112 is pressed down, the projection 160 and the cutaway 158 engage. Because of this, the spring terminal 150 and the conductor 152 maintain a state of contact when the horn 112 is pressed down hard.

When the horn 112 is pulled hard in an upward direction of the drawing, the engagement between the cutaway 158 and the projection 160 is broken, and the spring terminal 150 and the conductor 152 change to a state of non-contact, because of which the power line 130 is disconnected. When the power line 130 is disconnected, a supply of power from the battery 118 to the drive mechanism 120 and the like ceases to be carried out, because of which the robot 100 performs an emergency stop.

A stopper 162 is formed on an outer periphery of the horn 112. A restricting face 164 is formed on the outer shell 154. As the stopper 162 catches on the restricting face 164, the horn 112 does not become completely detached from the robot 100, even when the horn 112 is pulled.

As the method is such that the power line 130 is physically disconnected by the horn 112, the robot 100 can simply and reliably be caused to perform an emergency stop. As the method is such that the power line 130 is disconnected by pulling the horn 112 (hereafter called a "pulling method"), rather than a method causing an emergency stop to be performed by pressing a button (hereafter called a "pushing method"), there is little risk of the robot 100 performing an emergency stop due to force majeure when bumping into an obstacle such as a wall. According to the interrupting mechanism 240 of this embodiment, the robot 100 can be caused to perform an emergency stop using a reliable and simple method, and moreover, the risk of the robot 100 erroneously performing an emergency stop due to force majeure can be greatly restricted.

Compared with a phenomenon of being "mistakenly pressed" due to force majeure, the probability of a phenomenon of being "mistakenly pulled" occurring is low. The horn 112 is desirably of a simple form that is unlikely to catch on an external obstacle. The horn 112 may be a cylindrical object, or may be conical with a rounded leading end portion.

The robot 100 in this embodiment is far shorter than a normal adult. Because of this, the pulling method whereby the horn 112 protruding from a head portion of the robot 100 is gripped and pulled is such that the robot 100 is more easily caused to perform an emergency stop than when attaching a small emergency stop button to a surface of the robot 100. As the robot 100 is lightweight, as heretofore described, a case in which the robot 100 itself moves, and is not caused to perform an emergency stop, due to force when pressing a button, and a case in which the robot 100 is knocked over due to greater than necessary force being applied, are envisaged when employing the pushing method. When using the pulling method, even the lightweight robot 100 can reliably perform an emergency stop.

Figure 7:
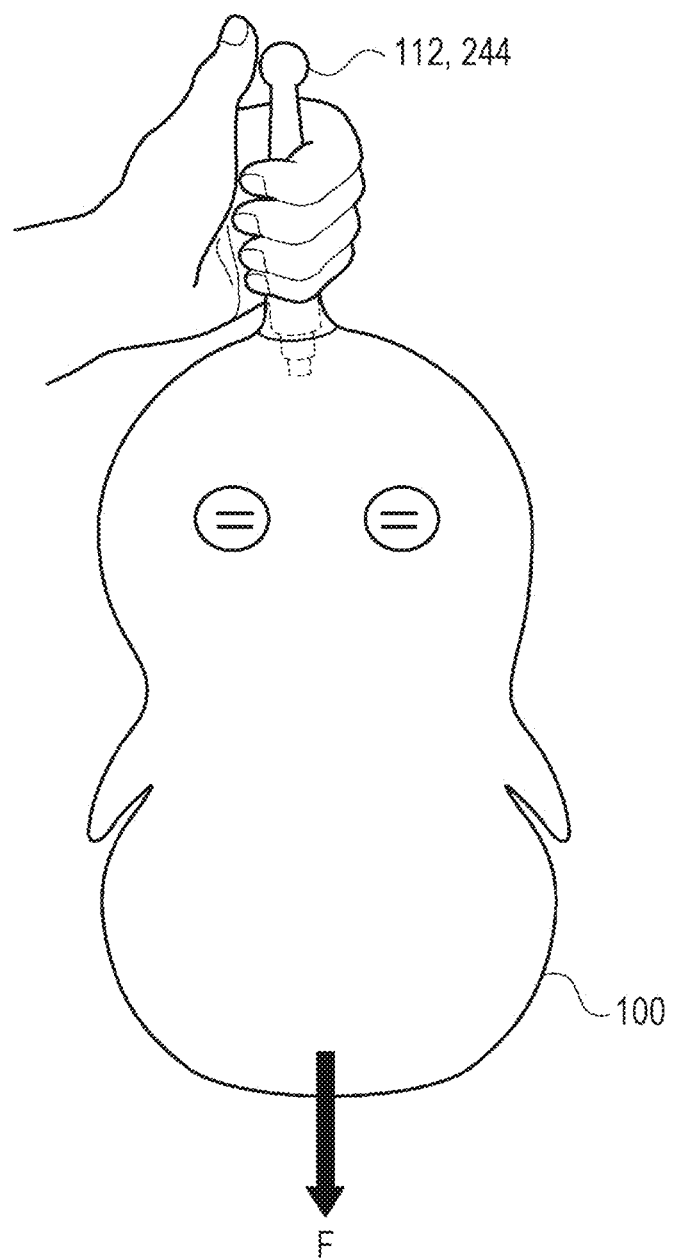
FIG. 7 is a schematic view of when a user grips a horn and holds up the robot.

FIG. 7 is a schematic view of when a user grips the horn 112 and holds up the robot 100.

The horn 112 is essentially fixed by the engagement strength of the cutaway 158 and the projection 160. When a user grips the horn 112 and lifts up the robot 100, the engagement between the cutaway 158 and the projection 160 breaks owing to the weight (gravitational force F) of the robot 100, and the robot 100 performs an emergency stop. In other words, by the engagement strength of the cutaway 158 and the projection 160 being set to be smaller than the weight of a main body portion (the body 104 and objects incorporated therein) of the robot 100, the robot 100 can be caused to perform an emergency stop by gripping the horn 112 and holding up the robot 100.

Even when the robot 100 is moving around energetically, the robot 100 can easily be caused to calm down by gripping the horn 112 and holding up the robot 100. Because of this, the horn 112 can be portrayed as being a weak point of the robot 100.

Figure 8:
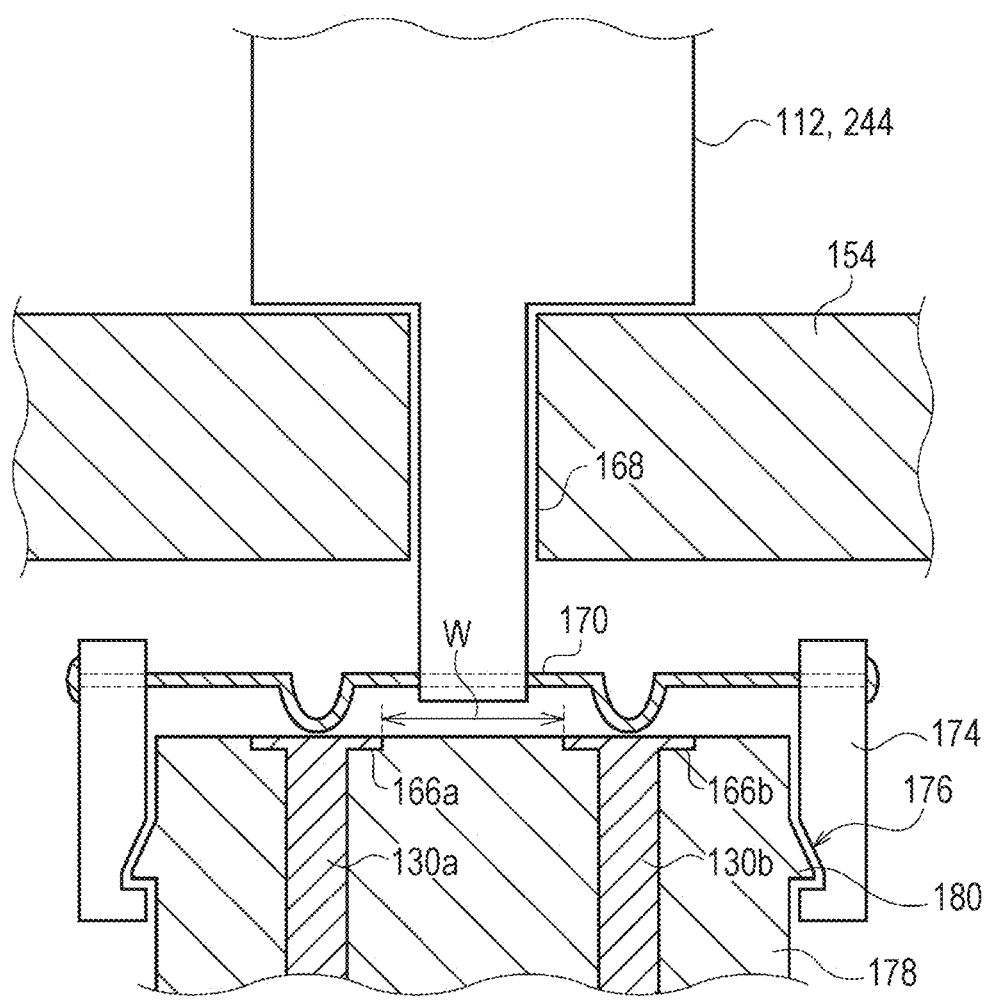
FIG. 8 is a configuration diagram of the interrupting mechanism in a first modified example.

FIG. 8 is a configuration diagram of the interrupting mechanism 240 in a first modified example.

In the first modified example, power lines 130a and 130b are embedded in a substrate 178 made of resin. A terminal 166a is exposed in a leading end portion of the power line 130a, and a terminal 166b is exposed in a leading end portion of the power line 130b. The two terminals 166 are distanced by the width W. The power line 130 is partially disconnected in the first modified example too.

A conductive coupling terminal 170 is fixed to the leading end of the horn 112. By coming into contact with both the terminal 166a and the terminal 166b, the coupling terminal 170 causes the power line 130a and the power line 130b to have continuity. An end portion of the coupling terminal 170 is fixed by a fixing member 174 made of resin. The coupling terminal 170 is fixed to the substrate 178 by a cutaway 176 formed in an inner face of the fixing member 174 and a projection 180 formed on an outer face of the substrate 178 being engaged. The engagement strength of the cutaway 176 and the projection 180 is also preferably set to be smaller than the weight of the main body portion of the robot 100.

When the horn 112 is pulled hard, the engagement between the cutaway 176 and the projection 180 is broken, the coupling terminal 170 and the terminal 166 change to a state of non-contact, the power line 130 is disconnected, and the robot 100 performs an emergency stop. As the coupling terminal 170 is larger than a through hole 168 of the outer shell 154, the horn 112 does not come completely out of the robot 100. The interrupting mechanism 240 of the first modified example is such that there is no need to form the conductor 152 on the horn 112.

Figure 9:
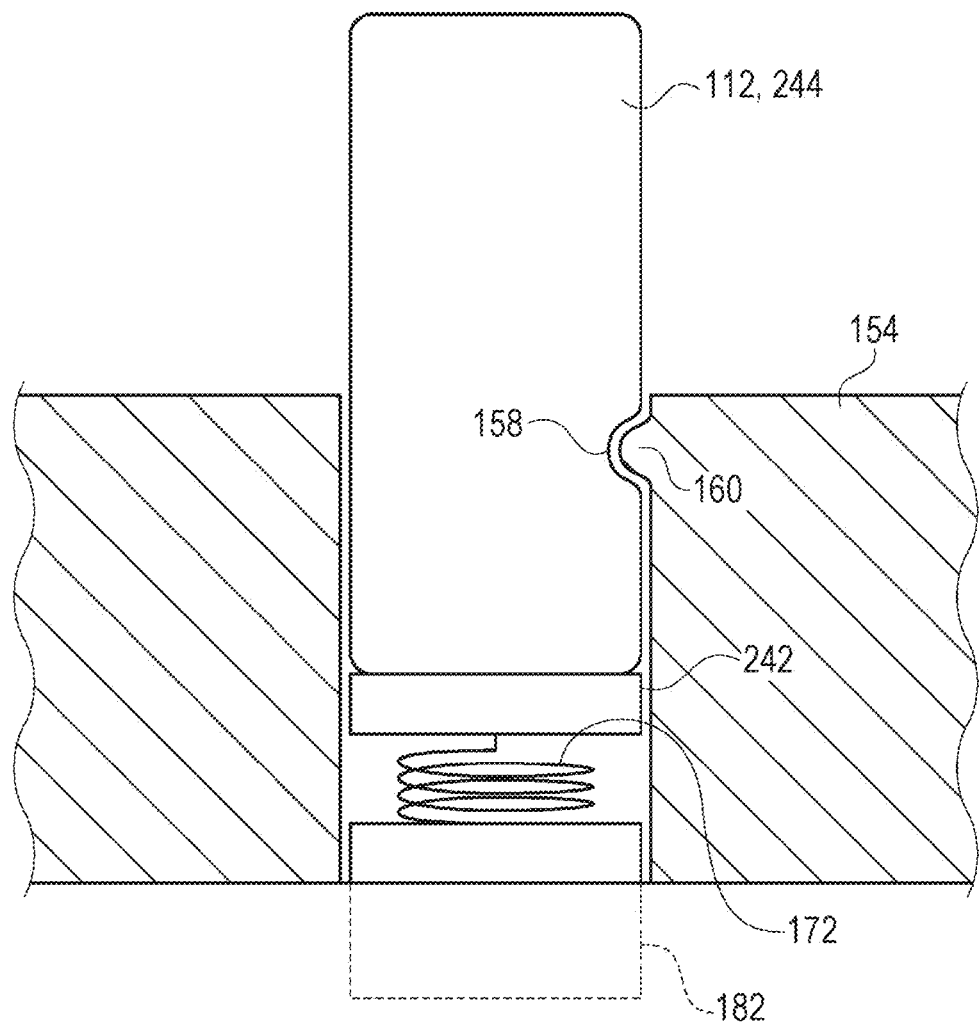
FIG. 9 is a configuration diagram of the interrupting mechanism in a second modified example.

FIG. 9 is a configuration diagram of the interrupting mechanism 240 in a second modified example.

In the second modified example, the power line 130 has continuity when a button 182 is pressed down. The button 182 is a push button type of switch, and is configured so as to be on when in a pressed down state, and off when not being pressed down. Consequently, the second modified example is also a pulling method in that an on-state is created when the horn 112 is pressed in, and an off-state is created when the horn 112 is pulled out. As the button 182 is embedded in the outer shell 154, the button 182 cannot be operated unless the horn 112 is used. The button 182 is connected to a pedestal 242 via a spring 172. When the horn 112 is pressed against the pedestal 242, the button 182 is pressed down. By the cutaway 158 in an outer face of the horn 112 and the projection 160 on an inner face of the outer shell 154 being engaged, a pressed down state, or in other words, a state of the power line 130 having continuity, is maintained.

When the horn 112 is pulled, the engagement between the cutaway 158 and the projection 160 is broken. When the button 182 ceases to be pressed down by the horn 112, the button 182 rises in the upward direction of the drawing owing to a biasing force of an unshown spring. At this time, the button 182 causes the power line 130 to be disconnected using the same kind of method as that shown in FIGS. 6 and 8. In the second modified example, the horn 112 can be completely separated from the robot 100. Also, there is no need to provide an electrical configuration relating to an emergency stop in the horn 112 in the second modified example either.

Figure 10:
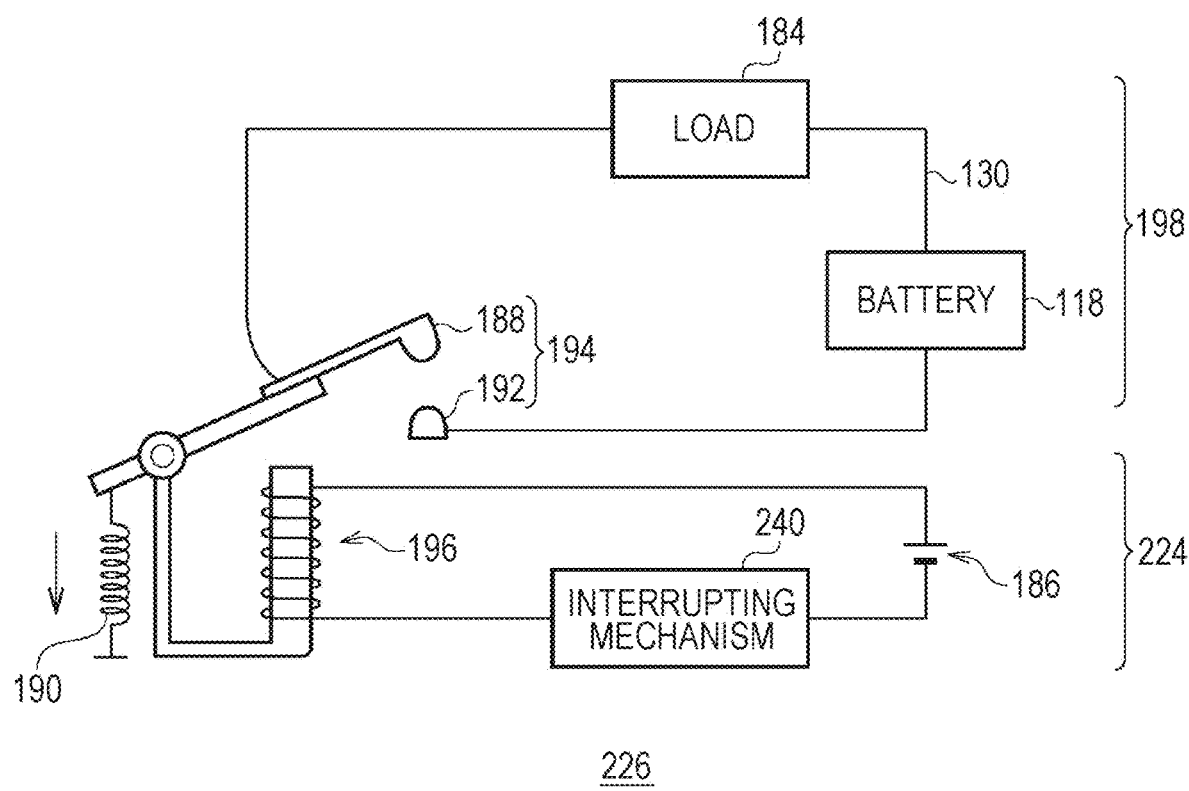
FIG. 10 is a diagram of a current interrupting circuit.

FIG. 10 is a diagram of a current interrupting circuit 226.

The current interrupting circuit 226 includes a main circuit 198 and a relay control circuit 224. Although the interrupting mechanism 240 may interrupt the power line 130 directly, as described in connection with FIGS. 6 and 8, an indirect power stoppage shown in FIG. 10 can also be employed. In the current interrupting circuit 226, the interrupting mechanism 240 causes a supply of power to the main circuit 198 to be stopped by causing a supply of power to the relay control circuit 224 to be stopped.

The main circuit 198 includes the battery 118, a load 184, and a relay switch 194. The load 184 is a collective name of members to which power is supplied from the battery 118, such as the internal sensor 128, the communicator 126, the storage device 124, the processor 122, and the drive mechanism 120. The relay switch 194 is set to be normally open by a spring 190.

The relay control circuit 224 controls opening and closing of the relay switch 194. The relay control circuit 224 includes a power supply 186, the interrupting mechanism 240, and an electromagnet 196. The interrupting mechanism 240 controls a supply of power from the power supply 186 to the electromagnet 196 using the method described in connection with FIG. 6 and the like. When the relay control circuit 224 is in an energized state, the electromagnet 196 attracts an iron movable terminal 188 of the relay switch 194. When the movable terminal 188 comes into contact with a fixed terminal 192 against a biasing force of the spring 190, the main circuit 198 is also energized.

The interrupting mechanism 240 is such that when the horn 112 is pulled, the supply of power to the electromagnet 196 is stopped. The movable terminal 188 separates from the fixed terminal 192 owing to the biasing force of the spring 190, and the supply of power to the main circuit 198 is stopped.

Even when a large current flows into the main circuit 198, the relay control circuit 224 can be controlled by a small current. As the horn 112 (gripping portion 244) does not come into direct contact with the main circuit 198, safety is greater than when the interrupting mechanism 240 is brought into direct contact with the power line 130.

Heretofore, the robot 100, and the robot system 300 including the robot 100, have been described based on an embodiment.

As the robot 100 travels using the wheels 102, the robot 100 can move more swiftly in some places than a robot that walks on two legs. According to the method shown in this embodiment, even the small and swift robot 100 can easily and reliably be caused to perform an emergency stop simply by gripping the horn 112 and lifting up the robot 100. Meanwhile, in the case of the pushing method, there are cases in which reliably pressing a small button in a time of emergency is difficult. When increasing the size of the button, or when increasing the number of buttons, there is a high possibility of the robot performing an emergency stop due to force majeure.

In this embodiment, the horn 112 (gripping portion 244) is caused to protrude from the head portion of the short robot 100, because of which the horn 112 is in a position in which the horn 112 is easy to grab as seen by a user. As the gripping portion 244 is designed as the "horn 112", which is one portion of the body of the robot 100, an appearance of the gripping portion 244 as being out of place is alleviated. Also, the robot 100 being rounded, soft, and light also contributes to the safety of the robot 100.

The invention not being limited to the heretofore described at least one embodiment or a modified example, components can be changed or embodied without departing from the scope of the disclosure. Various implementations may be formed by a multiple of the components disclosed in the heretofore described at least one embodiment or the modified example being combined as appropriate. Also, some components may be eliminated from the total of components shown in the heretofore described at least one embodiment or the modified example.

Although a description has been given assuming that the robot system 300 is configured of one robot 100, one server 200, and the multiple of external sensors 114, one portion of the functions of the robot 100 may be realized by the server 200, and one portion or all of the functions of the server 200 may be allocated to the robot 100. One server 200 may control a multiple of the robot 100, or a multiple of the server 200 may control one or more of the robot 100 in cooperation.

A third device other than the robot 100 and the server 200 may manage one portion of functions. A collection of the functions of the robot 100 and the functions of the server 200 described in FIG. 5 can also be comprehensively grasped as one "information processing device". In at least one embodiment, a method of distributing the multiple of functions needed in order to realize the invention with respect to one or multiple items of hardware is determined with consideration to the processing capability of each item of hardware, specifications required of the robot system 300, and the like.

The gripping portion 244 for interrupting current in the interrupting mechanism 240 need not be the "horn 112". It is sufficient that the gripping portion 244 is formed as a projecting object that protrudes from the outer shell 154 of the robot 100 and can be gripped. Furthermore, even when the gripping portion 244 is not a projecting object, an emergency stop using the pulling method can be performed.

Figure 11:
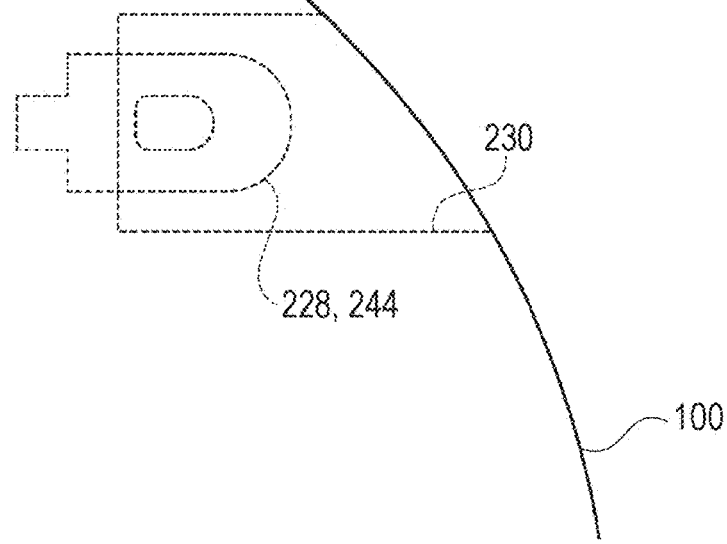
FIG. 11 is a schematic view of a gripping portion in a third modified example.

FIG. 11 is a schematic view of the gripping portion 244 in a third modified example.

In the third modified example, a hollow portion 230 may be formed in the robot 100, and a handle 228 (the gripping portion 244) installed in the hollow portion 230. The robot 100 is caused to perform an emergency stop by a user inserting a finger or a hand into the hollow portion 230, and pulling the handle 228. An outward appearance of the robot 100 can be smartened by the whole or one portion of the handle 228 being housed in the hollow portion 230. Also, the risk of the handle 228 being pulled out due to force majeure is lower still.

Figure 12:
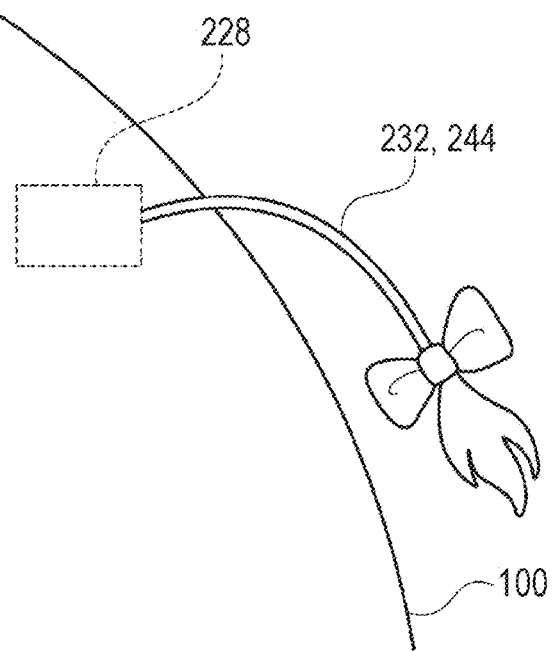
FIG. 12 is a schematic view of the gripping portion in a fourth modified example.

FIG. 12 is a schematic view of the gripping portion 244 in a fourth modified example.

In the fourth modified example, the handle 228 incorporated in the robot 100 is pulled using a string 232. The string 232 may be a normal string, or may be decorated with hair, an accessory, or the like.

Another circuit, such as the relay control circuit 224, may be controlled by a wireless signal. A receiving circuit that turns off a switch of the power line 130 when a predetermined stop signal is sent from a mobile terminal such as a smartphone may be installed. The power may be stopped when a predetermined keyword is recognized using speech recognition. Also, an emergency stop caused by an electrical signal and a physical emergency stop caused by pulling out the gripping portion 244 may be used together.

The horn 112 may be capable of being completely separated from the robot 100. By the stopper 162 being removed from the horn 112 of FIG. 6, the horn 112 can be separated from the robot 100 in the same way as in the second modified example of FIG. 8. By the horn 112 for activating the robot 100 being portable, the horn 112 can be caused to function in the same way as an ignition key of the robot 100.

Meanwhile, in a case of a configuration wherein the horn 112 does not separate from the robot 100, there is an advantage in that a risk of losing the horn 112 can be restricted.

The horn 112 may incorporate one portion of the various kinds of unit shown in FIG. 4. For example, the horn 112 may incorporate the whole or one portion of the internal sensor 128, or the whole or one portion of the battery 118.

When the robot 100 is rendered incapable of operating in terms of both power and function by removing the horn 112, the function of the horn 112 as a "key" can be further strengthened.

In this embodiment, it has been described that the robot 100 films various users, also acquires other data such as smell, speech, and body temperature when filming, carries out an extraction of characteristics from these items of data, and identifies (clusters) a multiple of users by carrying out cluster analysis.

As a modified example, a user may set the physical characteristics and the behavioral characteristics of each user in the server 200 in advance. For example, as characteristics of Dad (01), information such as having a beard, getting up early, being 170 centimeters tall, and being a smoker may be provided as teacher data to the individual data storage unit 218 of the server 200. Based on these items of characteristic information, the server 200 may carry out user detection using an already known method, such as deep learning.

A smell category can also be utilized as information for clustering users.

As easier user recognition means, the robot 100 may identify a user by regularly receiving user ID from a mobile device such as a smartphone possessed by the user. With regard to a pet too, easy identification can be carried out by attaching a radio frequency identifier (RFID) tag to a collar. According to this kind of control method, the processing burden of the robot 100 and the server 200 can be considerably reduced.

The robot 100 may identify the positional coordinates of the robot 100 by transmitting a search signal and receiving a response signal from each external sensor 114. Alternatively, the external sensor 114 may transmit a search signal with directivity, whereby the robot 100 may identify the distance and direction to the robot 100 from the external sensor 114.

Next, an improved example of the horn 112 and a joint mechanism 500 thereof will be described.

Figure 13:
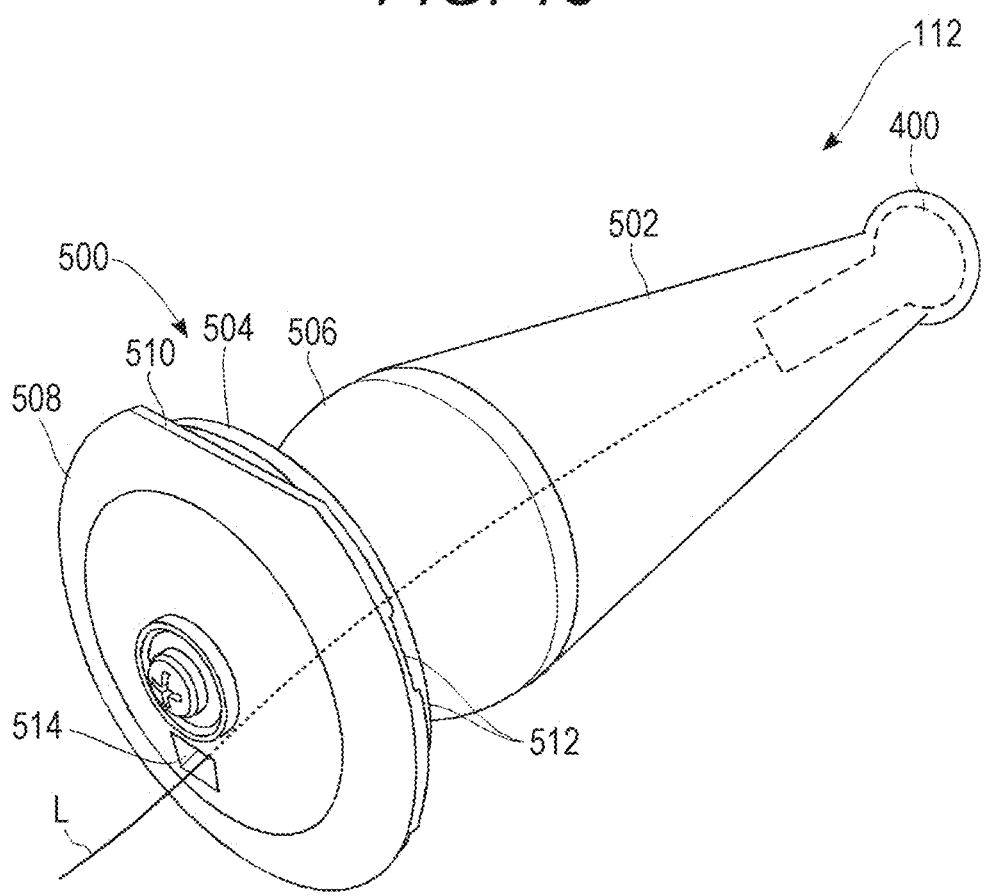
FIG. 13 is a perspective view representing an external appearance of the horn.
Figure 14A:
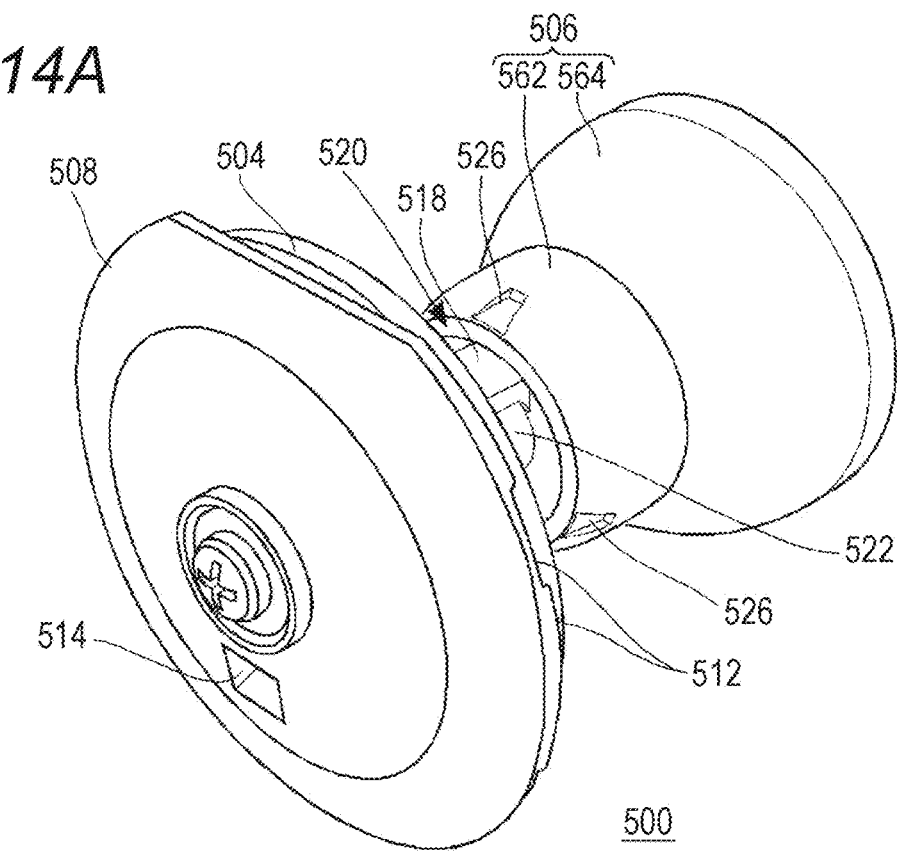
FIGS. 14A and 14B are perspective views representing a joint mechanism.
Figure 14B:
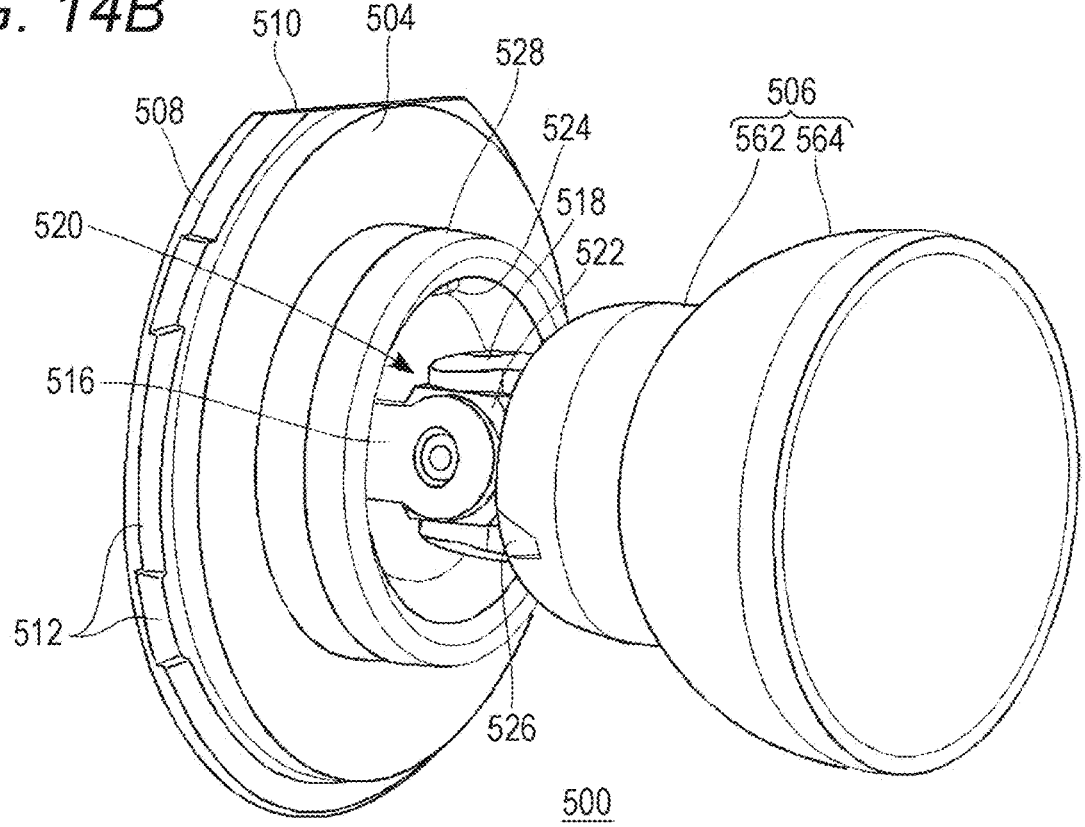

FIG. 13 is a perspective view representing an external appearance of the horn 112. FIGS. 14A and 14B are perspective views representing the joint mechanism 500. FIG. 14A is a diagram of an uncoupled state of the joint mechanism 500 seen from obliquely in front (from below the horn 112 in FIG. 2), and FIG. 14B is a diagram of the joint mechanism 500 in the same state seen from obliquely behind (from above the horn 112 in FIG. 2).

As shown in FIG. 13, the horn 112 is configured by a horn main body 502 being installed in the joint mechanism 500 (a joint structure). An omnidirectional camera 400 acting as a "sensor module" is housed in the horn main body 502. The joint mechanism 500 includes a first member 504 and a second member 506. The first member 504 is installed in the head portion of the robot 100. The horn main body 502 is installed in the second member 506. Although the first member 504 and the second member 506 are formed of resin in this embodiment, the first member 504 and the second member 506 may also be obtained by molding a metal material.

The first member 504 has a flange-form large diameter portion 508, and one portion of a peripheral edge of the large diameter portion 508 is cut away to be flat (a cutaway 510). A circular hole of practically the same shape that engages with the cutaway 510 is provided in a crown portion of the robot 100, so that positioning when carrying out assembly work is easy. Also, an engagement structure 512 having a step in a circumferential direction is formed in a peripheral edge portion of a back face of the large diameter portion 508. An engagement structure corresponding to the engagement structure 512 is formed in the head portion of the robot 100. The first member 504 can be fixed to the head portion by the large diameter portion 508 being applied so that a form thereof corresponds to the circular hole in the head portion of the robot 100, and the first member 504 being rotated around an axial line. An insertion hole 514 for passing wiring (the power line 130 and the signal line 132) through is formed in the first member 504.

As shown in FIGS. 14A and 14B, the joint mechanism 500 includes a first shaft 516 extending from the first member 504, and a second shaft 518 extending from the second member 506. The first shaft 516 and the second shaft 518 are linked via a joint 520. The joint 520 is a universal joint, and includes a coupling member 522 to which the first shaft 516 and the second shaft 518 are each connected so as to be capable of pivoting.

The first member 504 supports the first shaft 516 so as to be capable of pivoting around the axis of the first shaft 516. The second shaft 518 supports the second member 506 so as to be capable of sliding in an axial direction. By causing the second member 506 to slide forward (in a direction approaching the first member 504) from the state shown in FIGS. 14A and 14B, the first member 504 and the second member 506 can be caused to engage as shown in FIG. 13. A multiple of engagement projections 524 are provided on an inner peripheral face of the first member 504, and a multiple of engagement grooves 526 are provided in an outer peripheral face of a leading end portion of the second member 506. Rotation of the second member 506 with respect to the first member 504 can be locked by each engagement projection 524 being engaged in the corresponding engagement groove 526. Also, an annular elastic member 528 (rubber in this embodiment) is provided on a back face of the first member 504. The elastic member 528 absorbs a force acting between the first member 504 and the second member 506 when the two engage, and when the second member 506 separates from the first member 504, thereby preventing damage to or deformation of the first member 504 and the second member 506. The elastic member 528 also functions as a "coupling mechanism" that receives the second member 506 with an elastic force, and increases coupling force between the engagement units of the first member 504 and the second member 506.

Figure 15A:
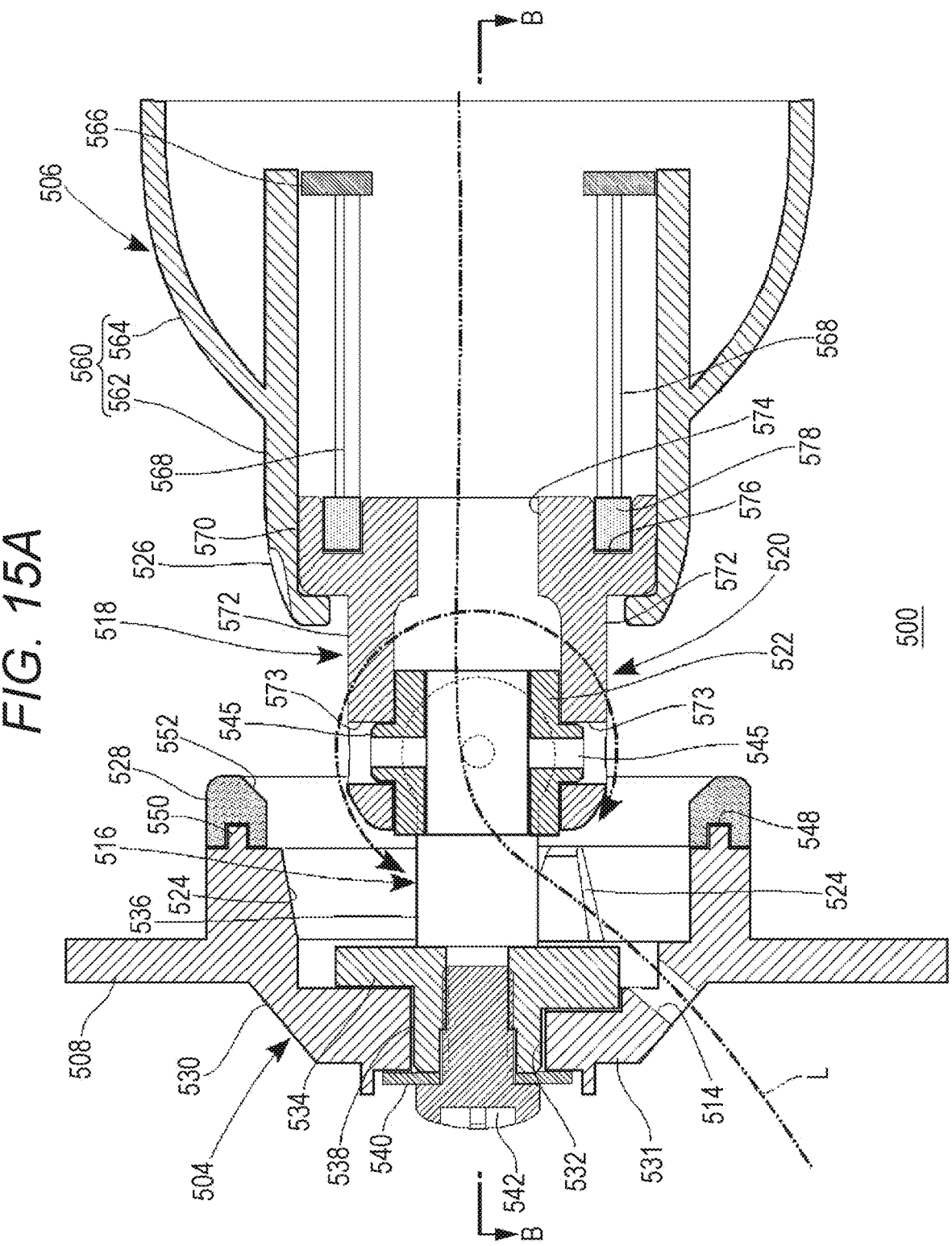
FIGS. 15A and 15B are sectional views representing an internal structure of the joint mechanism.
Figure 15B:
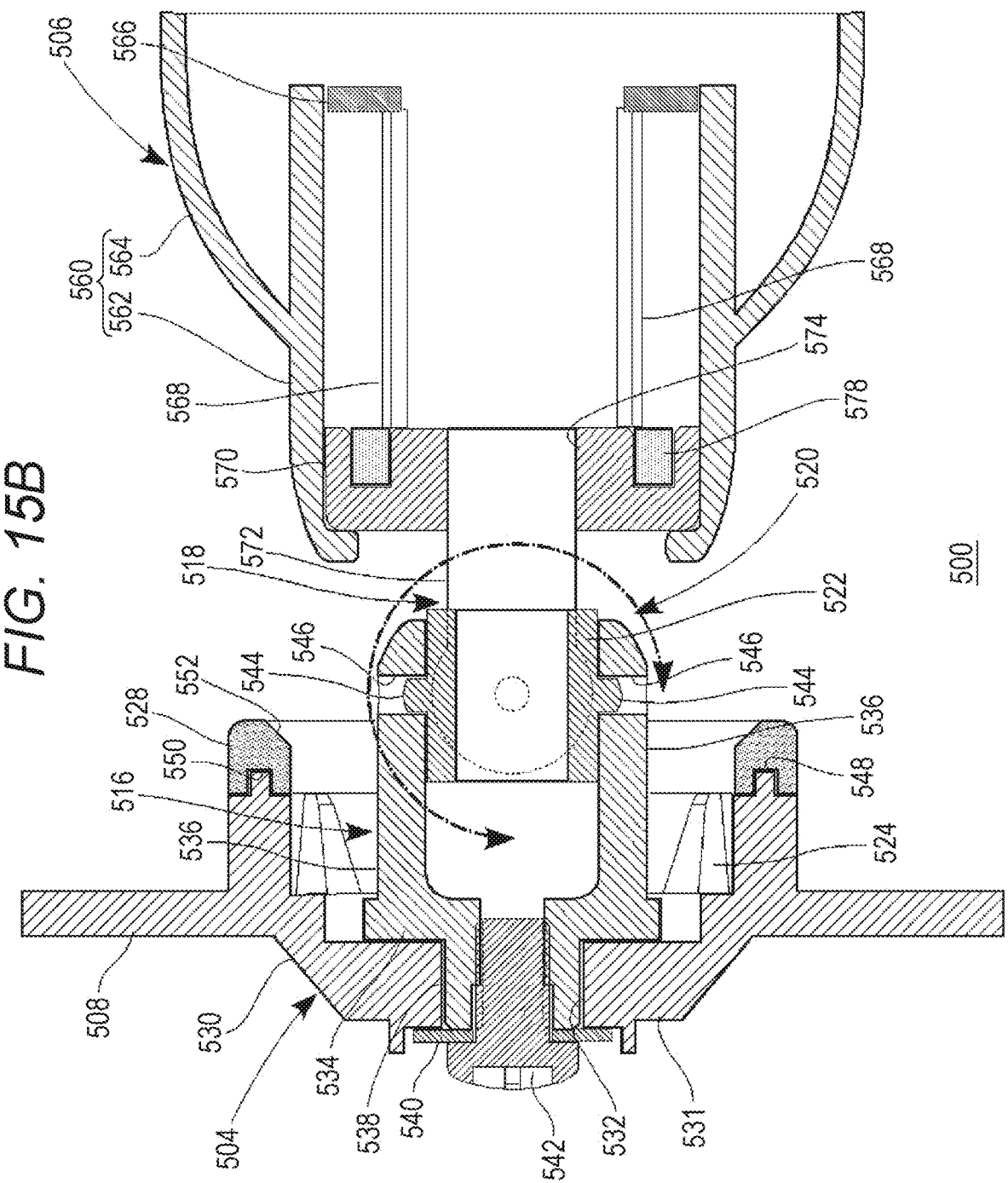
Figure 16A:
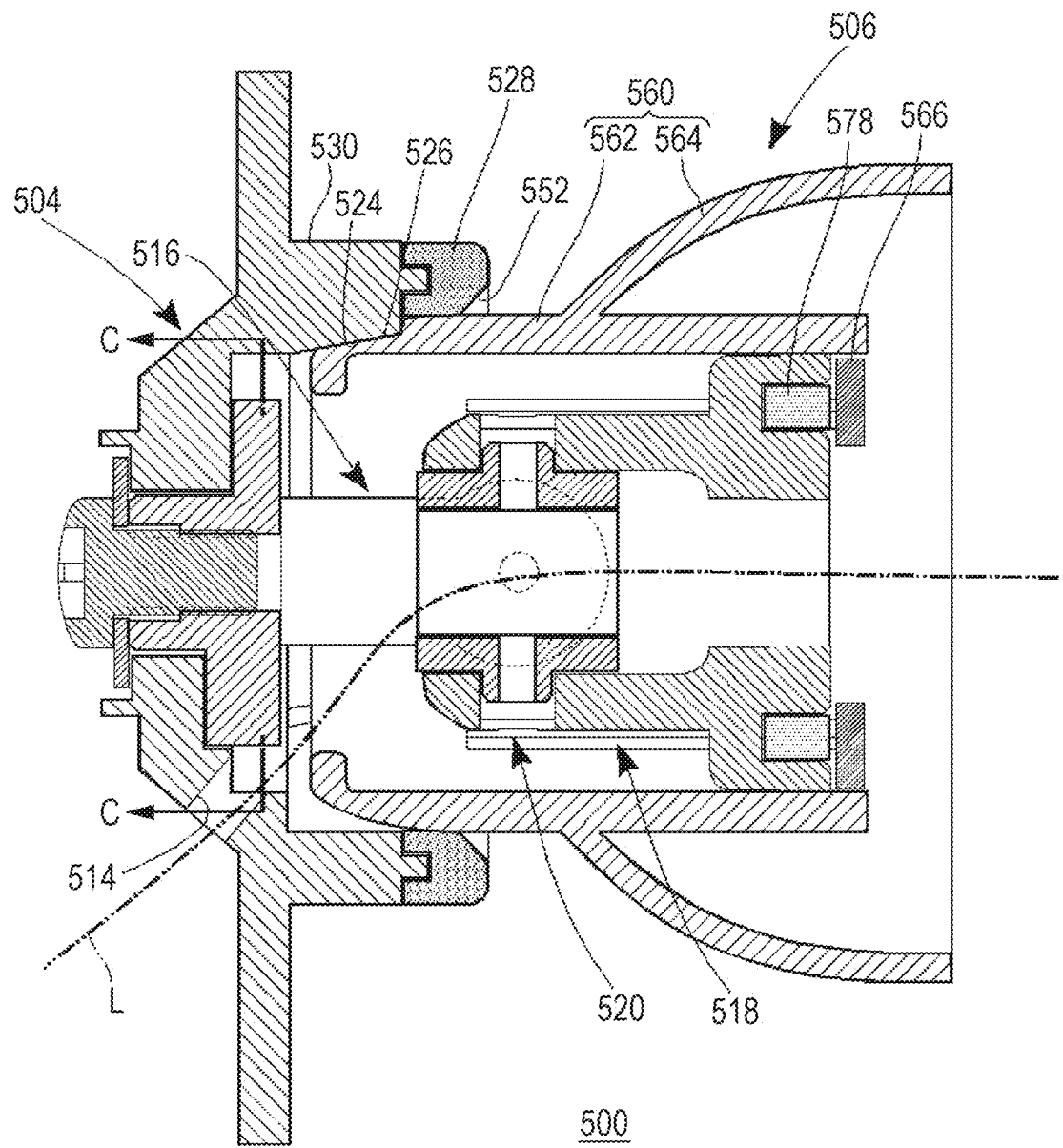
FIGS. 16A and 16B are sectional views representing the internal structure of the joint mechanism.
Figure 16B:
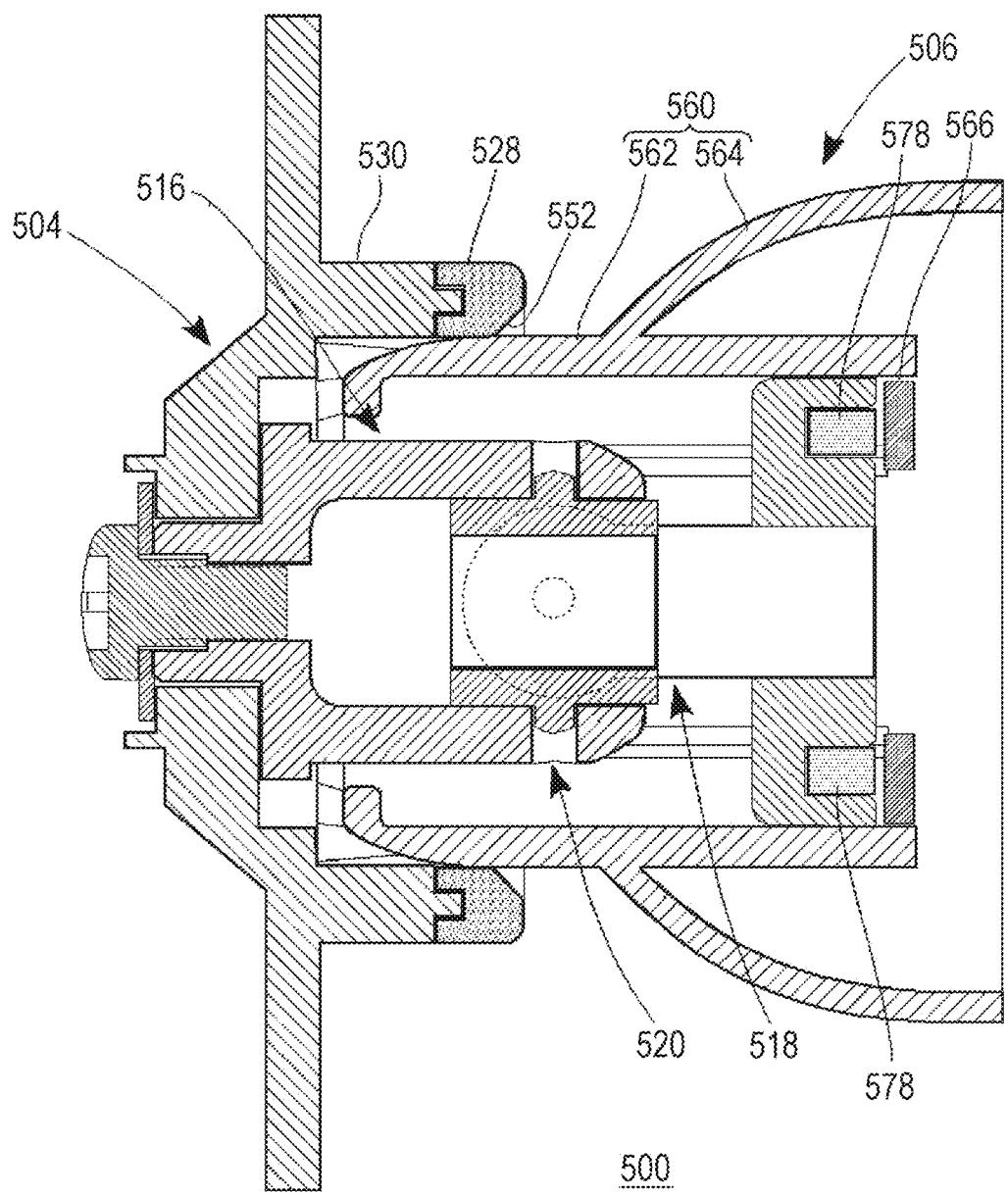

FIGS. 15A to 16B are sectional views representing an internal structure of the joint mechanism 500. FIGS. 15A and 15B show a non-engaged state of the first member 504 and the second member 506. FIG. 15A is a vertical cross-section, and FIG. 15B is a sectional view seen along a B-B arrow of FIG. 15A. Meanwhile, FIGS. 16A and 16B show an engaged state of the first member 504 and the second member 506. FIG. 16A corresponds to FIG. 15A, and FIG. 16B corresponds to FIG. 15B.

As shown in FIGS. 15A and 15B, the first member 504 has a bottomed, cylindrical main body 530. A flange portion extends outward in a radial direction from a side face of the main body 530, configuring the large diameter portion 508. The first shaft 516 is installed coaxially with the main body 530. An insertion hole 532 through which one end portion of the first shaft 516 is inserted is formed in a center of a bottom portion 531 of the main body 530.

The first shaft 516 has a disk-form base portion 534, a pair of arms 536 that extend in fork form from one side face of the base portion 534, and a circular boss-form shaft portion 538 that extends coaxially from an opposite side face of the base portion 534. The shaft portion 538 is inserted through the insertion hole 532. The pair of arms 536 are disposed symmetrically across an axial line of the base portion 534.

The shaft portion 538 is of a length dimension such that the shaft portion 538 protrudes slightly from the insertion hole 532, and a washer 540 is disposed so as to come into contact with a leading end surface of the shaft portion 538. The washer 540 has an outer diameter greater than that of the shaft portion 538, and is fastened to the shaft portion 538 by a screw 542. As shown in the drawings, the bottom portion 531 is sandwiched between the base portion 534 and the washer 540, but an interval between the base portion 534 and the washer 540 is slightly greater than a thickness of the bottom portion 531. According to this kind of configuration, the first shaft 516 is supported with respect to the first member 504 so as to be capable of rotating around the axis of the first shaft 516.

The coupling member 522 is supported so as to be sandwiched in leading ends of the pair of arms 536. The coupling member 522 forms a rectangular cylinder with a square cross-section, a pair of pivots 544 protrude from two side faces forming mutually opposite sides of four side faces of the coupling member 522, and a pair of pivots 545 protrude from the remaining two side faces. The pair of pivots 544 protrude coaxially and with opposite orientations, thereby forming a first rotary shaft. The pair of pivots 545 protrude coaxially and with opposite orientations, thereby forming a second rotary shaft. Axial lines of the rotary shafts are perpendicular to each other. A circular support hole 546 is provided in a leading end portion of each of the pair of arms 536, and the pair of pivots 544 are engaged one in each support hole 546. Because of this, the first shaft 516 and the coupling member 522 can pivot relatively around the axial line of the first rotary shaft.

The multiple of engagement projections 524 are disposed at predetermined intervals on an inner peripheral face of the main body 530. An annular mounting portion 548 is provided projecting at an opened end of the main body 530. An annular recessed groove 550 is formed in aback face of the elastic member 528. The elastic member 528 is mounted on the first shaft 516 by the recessed groove 550 being fitted on the mounting portion 548. Also, an opened end of the elastic member 528 is formed to be tapered (a tapered portion 552), whereby receiving the second member 506 is easy. The second member 506 is installed so that the leading end portion thereof slides along the elastic member 528, even when the second member 506 is somewhat inclined with respect to the first member 504.

Meanwhile, the second member 506 has a stepped, cylindrical main body 560. The main body 560 has a small diameter portion 562 that engages with or separates from the first member 504, and a large diameter portion 564 to which the horn main body 502 is connected. The second shaft 518 is installed coaxially with respect to the main body 560. A leading end portion of the small diameter portion 562 is of an R form, and the multiple of engagement grooves 526 are provided at predetermined intervals in a peripheral face of the small diameter portion 562. An outer peripheral face of the R-form small diameter portion 562 functions as an "engagement face" that engages with the first member 504. An annular magnetic member 566 is fixed to a back end portion of the small diameter portion 562. Also, a multiple of guide portions 568 are provided projecting on an inner peripheral face of the small diameter portion 562, extending in an axial direction.

The second shaft 518 has a cylindrical base portion 570, and a pair of arms 572 that extend in fork form from one side face of the base portion 570. The pair of arms 572 are disposed symmetrically across an axial line of the base portion 570. An insertion hole 574 for passing wiring L through is formed in a center of the base portion 570. The insertion hole 514, an internal passage of the coupling member 522, the insertion hole 574, and a passage connecting these, function as a "through path" that penetrates the first shaft 516 and the second shaft 518. A multiple of guide grooves (recessed grooves) that engage one each with the multiple of guide portions 568 are provided in an outer peripheral face of the base portion 570, extending in an axial line direction. Rotation of the second member 506 with respect to the second shaft 518 is prevented by engagement of the guide grooves. Rotation of the second member 506 around the axial line is ensured by rotation of the first shaft 516.

A circular support hole 573 is provided in a leading end portion of each of the pair of arms 572. The support holes 573 engage one each with the pair of pivots 545. Because of this, the second shaft 518 and the coupling member 522 can pivot relatively around the axial line of the second rotary shaft. According to this kind of configuration, the first shaft 516 and the second shaft 518 can pivot around each other via the coupling member 522 (a dashed-dotted line arrow in the drawings).

An outer diameter of the base portion 570 is practically equal to an inner diameter of the small diameter portion 562, and the second member 506 is supported by the second shaft 518 so as to be slidable in an axial line direction. An annular engagement groove 576 is provided in a back face of the base portion 570, and an annular magnet 578 (a permanent magnet in this embodiment) is fitted. The magnet 578 opposes the magnetic member 566 in the axial line direction.

When the second member 506 is caused to slide along the second shaft 518 from the state shown in the drawings, the second member 506 comes into proximity with the first member 504, and comes into contact with the elastic member 528. When the second member 506 is further pressed down against the elastic force of the elastic member 528, the small diameter portion 562 is inserted into the main body 530 of the first member 504, as shown in FIGS. 16A and 16B. The insertion is expedited by the tapered portion 552 of the elastic member 528 and the R form of the small diameter portion 562. At this time, rotation of the second member 506 can be locked by the engagement grooves 526 being caused to engage with the engagement projections 524. In this way, the first member 504 can be stably fixed to the second member 506 in a correct position.

Also, a magnetic force is generated between the magnet 578 and the magnetic member 566 at this time, because of which the second member 506 is suctioned (biased) in the axial line direction, and fixed closely to the second shaft 518. That is, fixing in the axial line direction of the second member 506 to the first member 504 is also stable. In other words, unless an external force exceeding the magnetic force is acting in a state in which the second member 506 is engaged with the first member 504, the second member 506 does not separate from the first member 504. That is, the horn 112 does not separate from the head portion of the robot 100. Resistance of the horn 112 to an external force can be regulated by a setting of the magnetic force of the magnet 578. The magnet 578 and the magnetic member 566 function as a "coupling mechanism" that causes a coupling force of the first member 504 and the second member 506 to be utilized to the full, and also functions as a "biasing mechanism" that increases a biasing force of the first member 504 and the second member 506 in a direction of coupling.

In this embodiment, strength of main components (the first member 504, the second member 506, the first shaft 516, the second shaft 518, the coupling member 522, and the like) other than the coupling mechanism (biasing mechanism) in the horn 112 is greater than the coupling force of the magnet 578 and the magnetic member 566. Because of this, the horn 112 is prevented from being broken without a dislocating action of the joint mechanism 500 occurring. Also, by the weight of the robot 100 (a load in a direction of gravitational force) being greater than the heretofore described coupling force, the horn 112 separates when pulled (comes out owing to a dislocating action). Furthermore, by the weight of the horn 112 (a load in a direction of gravitational force) being less than the heretofore described coupling force, the horn 112 can be held (the engaged state of the first member 504 and the second member 506 can be held) by the coupling force when the robot 100 is operating normally.

Meanwhile, even when the engagement between the first member 504 and the second member 506 is broken due to an external force exceeding the coupling force of the magnet 578 and the magnetic member 566 acting on the horn 112, the first shaft 516 and the second shaft 518 are coupled, because of which the connection between the second member 506 and the first member 504 is not broken. That is, even when the horn 112 separates from the head portion due to an aspect such as dislocation, the horn 112 does not fall off. The first shaft 516, the second shaft 518, and the coupling member 522 function as a "connecting member" that connects the first member 504 and the second member 506 by being interposed between the two. Strength of the connection of the first shaft 516 and the second shaft 518 by the coupling member 522 is of sufficient magnitude that the horn 112 (the second member 506) can be held after the first member 504 and the second member 506 separate.

Figure 17A:
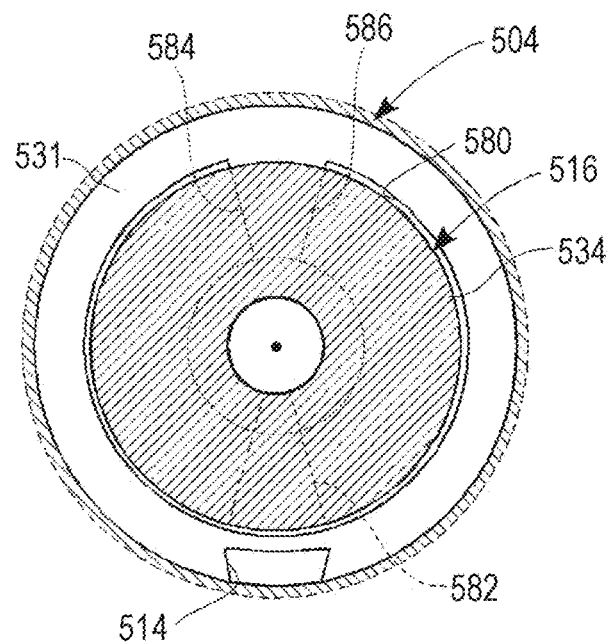
FIGS. 17A to 17C are illustrations representing a rotation restricting structure of a second member.
Figure 17B:
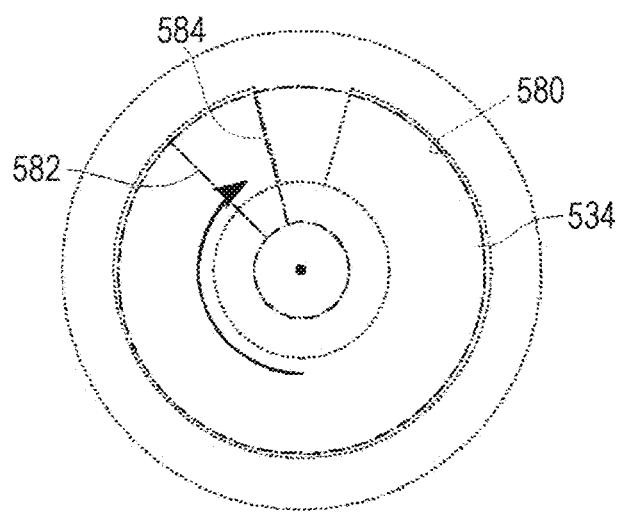
Figure 17C:
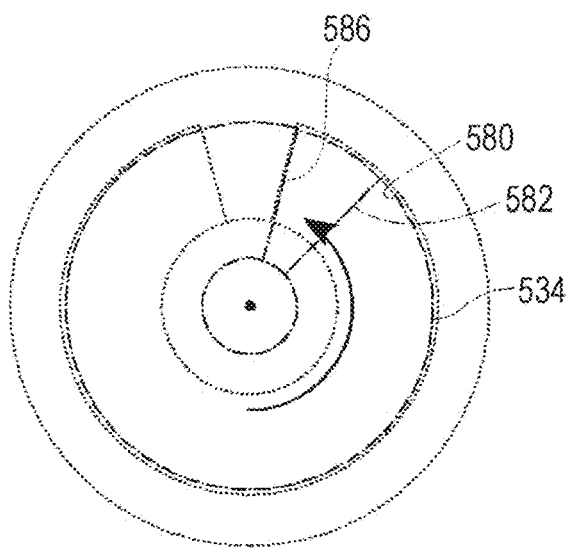

FIGS. 17A to 17C are illustrations representing a rotation restricting structure of the second member 506. FIG. 17A is a sectional view seen along a C-C arrow of FIG. 16A. FIGS. 17B and 17C are schematic views indicating a rotation limit when the second member 506 rotates from the state of FIG. 17A.

As shown in FIG. 17A, a rotation restricting structure that limits a range of an angle of rotation of the first shaft 516 around the axis of the first shaft 516 is provided between the bottom portion 531 of the first member 504 and the base portion 534 of the first shaft 516. That is, an annular guide groove 580 is formed in the bottom portion 531 in a face opposing the base portion 534. In this embodiment, the range of the guide groove 580 is set to a range of 330 degrees, with the axial line of the base portion 534 as a center, but the angle range can be set as appropriate in a range less than 360 degrees.

Meanwhile, a fan-form locking piece 582 is provided protruding on the base portion 534 on a face opposing the bottom portion 531, and engaged loosely in the guide groove 580. In this embodiment, a width of the locking piece 582 is set in a range of 30 degrees, with the axial line of the base portion 534 as a center, but the angle range can be set as appropriate.

When the first shaft 516 rotates in one direction, the first shaft 516 is locked on a wall 584 positioned at one circumferential end of the guide groove 580, as shown in FIG. 17B. When the first shaft 516 rotates in the other direction, the first shaft 516 is locked on a wall 586 positioned at the other circumferential end of the guide groove 580, as shown in FIG. 17C. Because of this, the angle of rotation of the first shaft 516 is limited to a predetermined angle range of less than 360 degrees (a range of 300 degrees in this embodiment). As already mentioned, rotation of the second member 506 around the axial line is secured by rotation of the first shaft 516, because of which a rotation angle range of the second member 506 is limited in the same way as that of the first shaft 516.

Figure 18A:
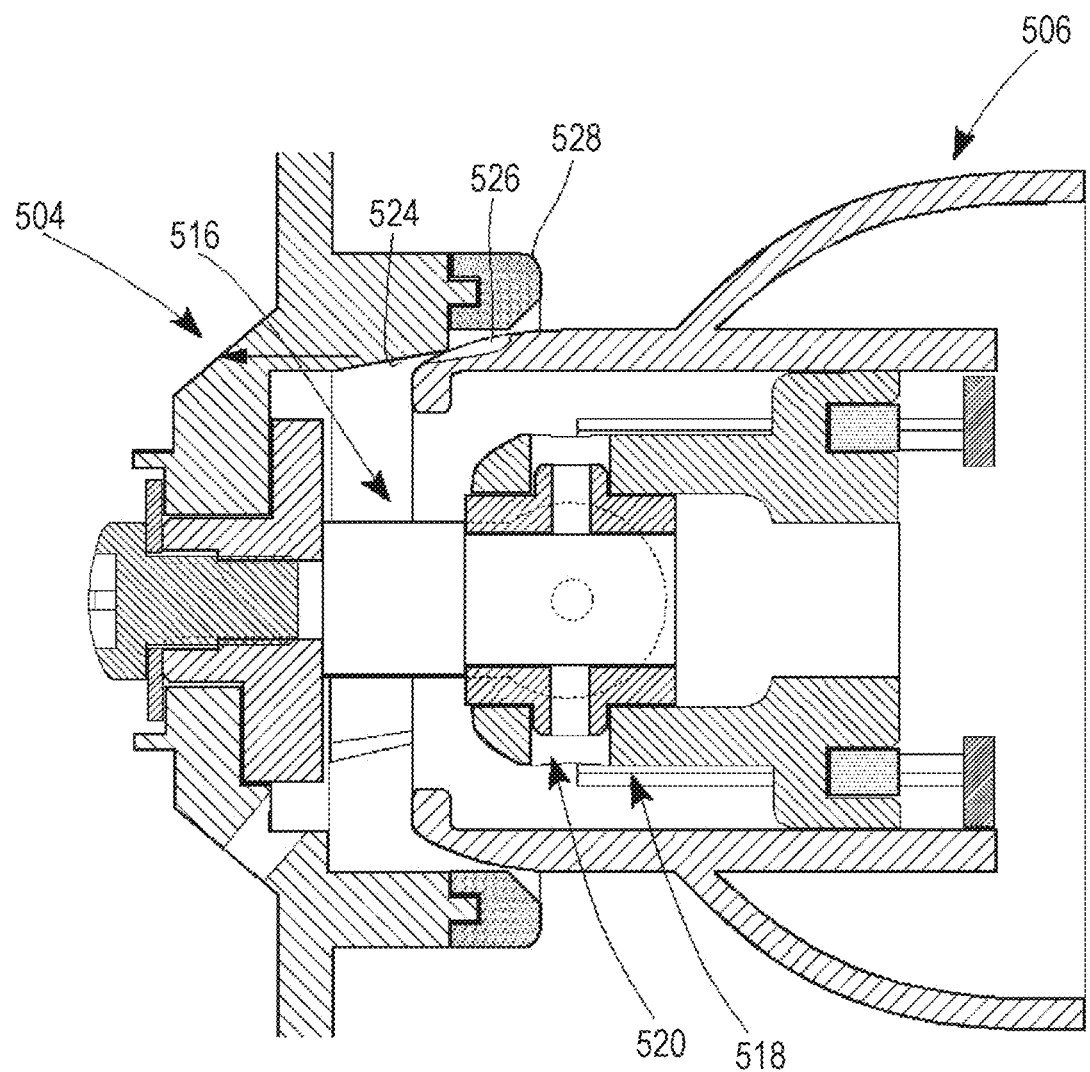
FIGS. 18A and 18B are diagrams showing an example of a separating process (engagement breaking) of the second member.
Figure 18B:
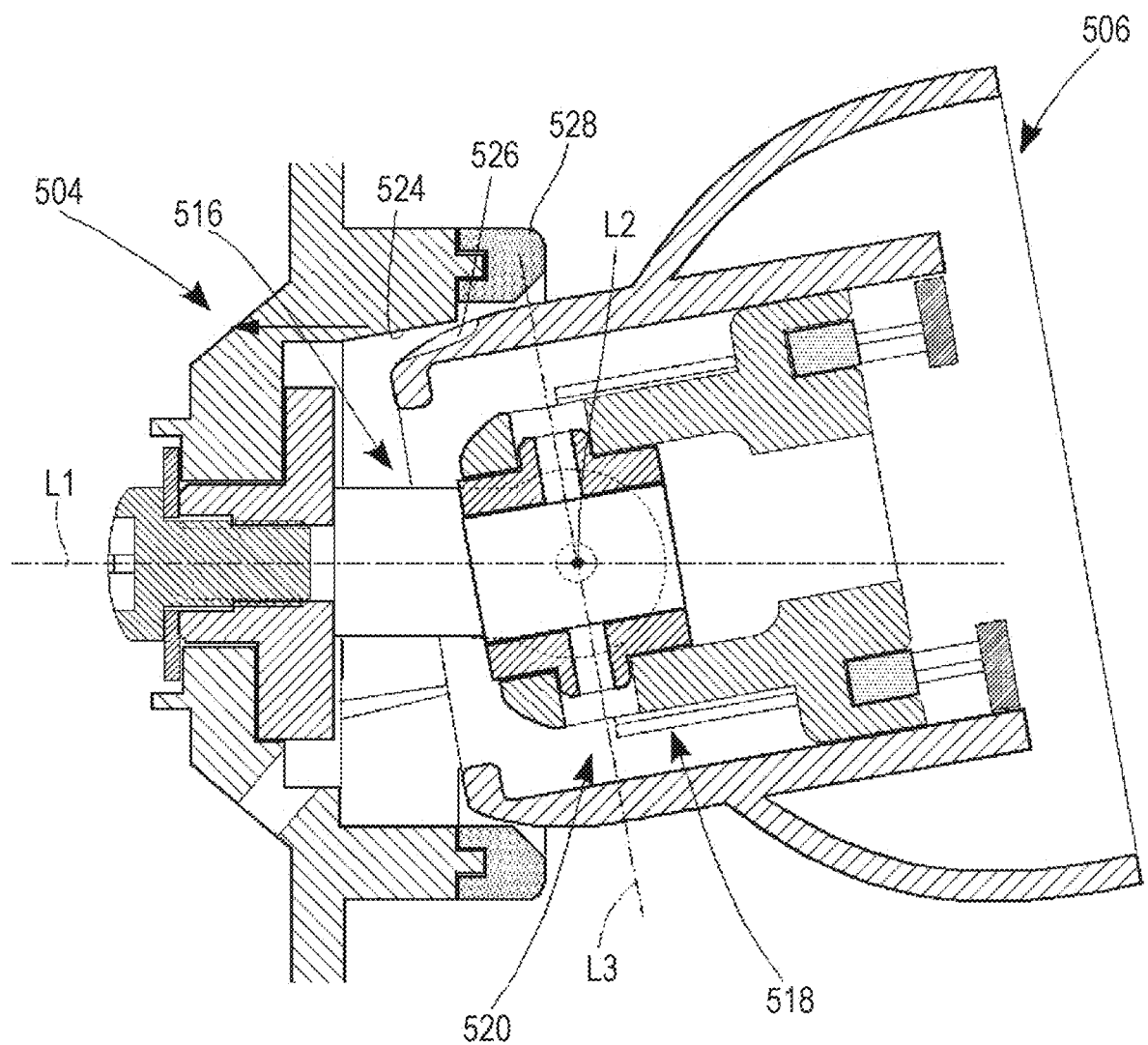

FIGS. 18A and 18B are diagrams showing an example of a separating process (engagement breaking) of the second member 506. FIGS. 18A and 18B show the separating process. In order to cause the second member 506 to separate from the first member 504, it is necessary to at least break the engagement between the engagement projections 524 and the engagement grooves 526, as shown in FIG. 18A, in order to do which it is necessary to cause an axial line direction force component to act on the second member 506.

When the second member 506 is displaced by a predetermined amount in a direction away from the first member 504, the engagement between the engagement projections 524 and the engagement grooves 526 is broken. By causing a radial direction force component to act on the second member 506 in this state, the second member 506 can be caused to pivot with respect to the first member 504 as shown in FIG. 18B. At this time, the second member 506 can pivot around an axial line L1 of the first shaft 516, around an axial line L2 of the first rotary shaft of the coupling member 522, and around an axial line L3 of the second rotary shaft of the coupling member 522 (that is, around three shafts). Because of this, operating freedom of the horn 112 increases.

According to the heretofore described improved example, the first member 504 provided in the main body of the robot 100 and the second member 506 configuring the horn 112 are configured so as to be capable of engaging and separating (breaking engagement). Even when an unenvisaged external force is exerted on the horn 112 during a behavioral process of the robot 100, an engaged state is broken when relative displacement of the first member 504 and the second member 506 exceeds a predetermined amount, and a phenomenon such as dislocation occurs, whereby a load resulting from the external force can be deflected. Because of this, damage to the horn 112 can be prevented. Also, even when the first member 504 and the second member 506 separate, the coupled state of the first shaft 516 and the second shaft 518 is maintained, because of which the horn 112 can be prevented from falling off.

Also, in the improved example, a through path penetrating the first shaft 516, the coupling member 522, and the second shaft 518 is formed, and the wiring L is passed through the through path. As the wiring L is passed through the joint 520 itself, wiring between members can be carried out at a minimum distance. Even when the joint 520 performs a complex rotating operation, the wiring L does not interfere with the operation. Furthermore, as the rotation angle range of the first shaft 516 is limited to less than 360 degrees, twisting of the wiring L (the power line 130 and the signal line 132) can be prevented or restricted. Because of this, cutting and damaging of the wiring L can be effectively prevented.

A magnetic sensor (non-contact sensor) formed of a Hall element or the like is disposed in a vicinity of the magnetic member 566, and an unshown detecting unit detects attachment and detachment of the magnet 578 and the magnetic member 566 (that is, whether or not the first member 504 and the second member 506 are engaged). The detecting unit determines that the horn 112 has come out based on the separation detection, and outputs an alert signal. The recognizing unit 156 (processor 122) turns off the power system power supply of the robot 100 in response to an input of the alert signal. Alternatively, the power line 130 may be connected with a connector that can be pulled out, and the wiring L inserted through the insertion hole 514 with a tension of an extent such that the connector comes out when the horn 112 is caused to separate (break engagement).

The interrupting mechanism 240 of the power line 130 may be incorporated in the joint mechanism 500, as described in this embodiment. For example, the interrupting mechanism 240 shown in FIGS. 15A and 15B can be realized by the engagement projections 524 of FIGS. 15A and 15B being utilized as the spring terminal 150 of FIG. 6, and outer side faces (for example, the engagement grooves 526 and the small diameter portion 562) of the main body 560 of FIGS. 15A and 15B being utilized as the conductor 152 of FIG. 6.

According to the heretofore described structure, engagement of the first member 504 and the second member 506 breaks not only when the horn 112 is pulled out from the main body, but also when a strong force is exerted on the horn 112 from a lateral direction. Because of this, the robot 100 can be caused to perform an emergency stop even when the robot 100 falls over, or when the robot 100 collides with a wall.

The movement determining unit 138 and the action determining unit 140 in this embodiment are collectively called an "operation determining unit". A function of the operation determining unit is realized by the processor 122 (an electronic circuit) and software executed in the processor 122. The power line 130 of the robot 100 may be divided into two systems, a first power line and a second power line. The first power line supplies power to an electronic circuit (control system) that does not accompany a physical drive, such as a monitor mounted in the robot, the internal sensor 128, the processor 122, and the storage device 124. Meanwhile, the second power line supplies power to a mechanism (actuator) that accompanies a physical drive, such as the drive mechanism 120. The second power line is of a higher voltage (greater power) than the first power line.

The interrupting mechanism 240 may cut off only the second power line when the horn 112 comes out. In this case too, an operation control unit can execute a control that does not accompany a drive, such as causing the eyes 110 to shine, or emitting a sound. When the horn 112 comes out, safety can be ensured, while maintaining a basic function of the robot 100, by cutting off only the second power line, which is involved in a physical drive, and supplies a large power.

When the horn 112 is caused to engage again after the horn 112 comes out, the supply of power to the second power line is restarted. A power control unit that determines whether or not to restart the supply of power to the second power line may be mounted in the robot 100. The power control unit permits the supply of power to the second power line when a predetermined power supply condition is met.

The power supply condition may be a restarting of the power supply being explicitly instructed by a user. For example, the power supply condition may be met by a user pressing a predetermined button installed in a nose or the like of the robot 100.

The robot 100 may incorporate a gyro sensor. Further, when the horn 112 is engaged, the supply of power to the second power line may be started with the robot 100 being in a horizontal state, or with the robot 100 being installed on the floor, as a power supply condition. According to this kind of control method, the robot 100 can be reactivated after confirming that the robot 100 is in a natural installation state, because of which safety when reactivating can be more reliably ensured.

When the horn 112 is pulled out, the operation control unit may cause a predetermined pupil image to be displayed on a monitor of the eyes 110, or may cause specific speech to be output. As the first power line is maintained even when the horn 112 is pulled out, the matter that the horn 112 has been pulled out can be brought to attention using an image or speech. The operation control unit cancels all processes being executed (calculated) when the second power line is cut off. Also, the operation control unit restarts when the horn 112 is engaged again and the second power line has continuity again. At this time, the operation control unit may cause a predetermined motion (operation) corresponding to a restarting of continuity to be executed. For example, a motion such as cocking the head or raising the hand (s) 116 is conceivable.

When the horn 112 is pulled out, an unshown inspection unit may check the state of each electronic circuit. Specifically, as already known, the presence or otherwise of an abnormality may be checked based on an output value when an inspection current is caused to flow through each kind of wiring. When an abnormality is detected, the inspection unit may automatically stop the continuity of the first power line.

What is claimed is:

1. An autonomously acting robot comprising:
   a main body portion, wherein the main body portion comprises:
   a drive mechanism configured to drive the main body portion,
   a power supply unit configured to supply power to the drive mechanism, and
   an interrupting mechanism configured to interrupt the supply of power to the drive mechanism; and
   a gripping portion attached to the main body portion, wherein the interrupting mechanism is configured to interrupt the supply of power in response to the gripping portion moving a predetermined distance in an axial direction outward from the main body portion, the gripping portion has a structure such that in response to a force is applied from a side face with respect to the axial direction the gripping portion is moved outward from the main body portion.

2. The autonomously acting robot according to claim 1, wherein the gripping portion protrudes from a head portion of the main body portion.

3. The autonomously acting robot according to claim 1, wherein the drive mechanism comprises at least one wheel for controlling movement of the main body portion.

4. The autonomously acting robot according to claim 1, wherein the interrupting mechanism is configured to physically disconnect a first portion of a power line from a second portion of the power line.

5. The autonomously acting robot according to claim 1, wherein the main body portion comprises a projection configured to hold the gripping portion in a location permitting supply of power, and the projection portion is configured to permit the gripping portion to move in the axial direction in response to a force equal to a weight of the robot.

6. The autonomously acting robot according to claim 1, wherein the gripping portion is completely separable from the main body portion.

7. The autonomously acting robot according to claim 1, wherein the gripping portion comprises a stopping element configured to prevent the gripping portion from being completely separated from the main body portion.

8. An autonomously acting robot comprising:
   a gripping portion;
   a main body portion for receiving the gripping portion, wherein the main body portion comprises:
   a first power line configured to supply power to an electronic circuit for selecting an operation of the autonomously acting robot,
   a second power line configured to supply power to a drive mechanism for executing the selected operation, and
   an interrupting mechanism configured to form an open circuit with respect to the second power line in response to the gripping portion moving a predetermined distance in an axial direction with respect to the main body portion, wherein continuity of the first power line is maintained regardless of a position of the gripping portion; and
   a power controller, wherein the power controller is configured to, after interrupting of the supply of power, supply power along the second power line in response to the gripping portion being pressed into the main body portion and a predetermined power supply condition is met.

9. The autonomously acting robot according to claim 8, wherein the second power line is configured to carry a higher voltage than the first power line.

10. The autonomously acting robot according to claim 8, wherein the predetermined power supply condition comprises a permitting instruction from a user.

11. The autonomously acting robot according to claim 8, further comprising an operation controller configured to select an operation of the robot, wherein the operation controller is configured to cancel a process in response to the gripping portion moving the predetermined distance in the axial direction.

12. The autonomously acting robot according to claim 11, wherein the operation controller is configured to restart processing in response to the gripping portion being pressed into the main body portion.

13. The autonomously acting robot according to claim 12, the operation control is configured to select a predetermined operation correlated to the restarting of processing.

14. The autonomously acting robot according to claim 8, wherein the gripping portion protrudes from a head portion of the main body portion.

15. The autonomously acting robot according to claim 8, wherein the drive mechanism comprises at least one wheel for controlling movement of the main body portion.

16. The autonomously acting robot according to claim 8, wherein the interrupting mechanism is configured to physically disconnect a power supply from a portion of the second power line.

17. The autonomously acting robot according to claim 8, wherein the main body portion comprises a projection configured to hold the gripping portion in a location permitting supply of power, and the projection portion is configured to permit the gripping portion to move in the axial direction in response to a force equal to a weight of the robot.

18. The autonomously acting robot according to claim 8, wherein the gripping portion is completely separable from the main body portion.

19. The autonomously acting robot according to claim 8, wherein the gripping portion comprises a stopping element configured to prevent the gripping portion from being completely separated from the main body portion.

20. An autonomously acting robot comprising:
   a first member constituting a main body of the autonomously acting robot; and
   a second member removably connected with the first member, the second member incorporating a sensor incorporated, wherein
   the first member comprises
      a drive mechanism configured to drive the main body, and
      an operation control unit configured to supply a processing command to the drive mechanism in response to a detection value from the sensor,
   the second member and the first member comprise an engaging structure configured to restrict a rotation of the second member around an axial line along a direction in which the second member removes from the first member,
   the autonomously acting robot further comprises
      a power source configured to supply a power to the drive mechanism, and
      an interrupting mechanism configured to interrupt the power from the power source in response to a removal of the second member from the first member.

* * * * *